US012670177B1

(12) United States Patent
Magoon et al.

(10) Patent No.: US 12,670,177 B1
(45) Date of Patent: Jun. 30, 2026

(54) ARTIFICIAL INTELLIGENCE SYSTEM FOR PROCESSING DATA FROM DISPARATE DATA SOURCES

(71) Applicant: Adonis Technology, Inc., New York, NY (US)

(72) Inventors: Akash Magoon, New York, NY (US); Aman Magoon, New York, NY (US); Daniel Young, New York, NY (US); Paul Cho, New York, NY (US); Gerardo Santacruz, New York, NY (US); Billy Bastardi, New York, NY (US); Manoj Kintali, New York, NY (US); Melanie Supple, New York, NY (US)

(73) Assignee: Adonis Technology, Inc., New York, NY (US)

( * ) Notice: Subject to any disclaimer, the term of this patent is extended or adjusted under 35 U.S.C. 154(b) by 0 days.

(21) Appl. No.: 19/007,387

(22) Filed: Dec. 31, 2024

(51) Int. Cl.
| | |
|---|---|
| *G06F 16/00* | (2019.01) |
| *G06F 16/21* | (2019.01) |
| *G06F 16/215* | (2019.01) |
| *G06F 16/25* | (2019.01) |

(52) U.S. Cl.
CPC .......... *G06F 16/258* (2019.01); *G06F 16/212* (2019.01); *G06F 16/215* (2019.01)

(58) Field of Classification Search
None
See application file for complete search history.

(56) References Cited

U.S. PATENT DOCUMENTS

| | | | |
|---|---|---|---|
| 9,971,979 | B2 | 5/2018 | Hakim |
| 10,853,455 | B2 | 12/2020 | Foster et al. |
| 11,341,786 | B1 | 5/2022 | Calmer et al. |
| 2010/0179852 | A1 | 7/2010 | Tomizuka et al. |
| 2011/0131247 | A1* | 6/2011 | Brown .................... G06F 16/36 707/E17.055 |
| 2012/0143634 | A1 | 6/2012 | Beyda et al. |
| 2015/0278728 | A1 | 10/2015 | Dinamani et al. |
| 2016/0063404 | A1 | 3/2016 | Doerr et al. |
| 2018/0191867 | A1 | 7/2018 | Siebel et al. |
| 2019/0087924 | A1 | 3/2019 | Seltzer et al. |
| 2021/0202099 | A1 | 7/2021 | Bostic et al. |
| 2022/0051276 | A1 | 2/2022 | Zelocchi |
| 2022/0122038 | A1 | 4/2022 | Duan et al. |

(Continued)

FOREIGN PATENT DOCUMENTS

EP 3627342 A1 * 3/2020 ............ G06F 16/211

*Primary Examiner* — Bai D Vu
(74) *Attorney, Agent, or Firm* — Young Basile Hanlon & MacFarlane, P.C.

(57) ABSTRACT

Processing and transforming data using an artificial intelligence (AI) system is described. A machine-learning-based data profiling tool may be used on first data associated with a first data source and second data associated with a second data source to generate first data profile content identifying first data schema content and second data profile content identifying second data schema content. A schema matching operation may be performed to generate schema matching data identifying a match between a first schema and a second schema. A data transformation operation may be performed to generate transformed data based on converting at least one of the first data or the second data from a source data format to a unified data format.

20 Claims, 15 Drawing Sheets

1100

1102 GENERATE FIRST DATA PROFILE CONTENT

1104 GENERATE SECOND DATA PROFILE CONTENT

1106 IDENTIFY SCHEMA MATCHING CONTENT

1108 GENERATE TRANSFORMED DATA

1110 STORE THE TRANSFORMED DATA WITHIN A DATABASE OF THE AI SYSTEM

(56) References Cited

U.S. PATENT DOCUMENTS

| | | |
|---|---|---|
| 2022/0300908 A1 | 9/2022 | Plotkin |
| 2023/0069416 A1 | 3/2023 | Walker et al. |
| 2023/0153309 A1* | 5/2023 | Coble ............... G06F 16/24578 |
| | | 707/727 |
| 2024/0153621 A1 | 5/2024 | Streich et al. |
| 2024/0311737 A1 | 9/2024 | Flannery et al. |
| 2024/0355460 A1 | 10/2024 | Sobolewski et al. |
| 2025/0094989 A1 | 3/2025 | Gopalakrishnan et al. |
| 2025/0165849 A1 | 5/2025 | Ali et al. |
| 2025/0291904 A1 | 9/2025 | Castinado et al. |

* cited by examiner

900

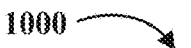

1000

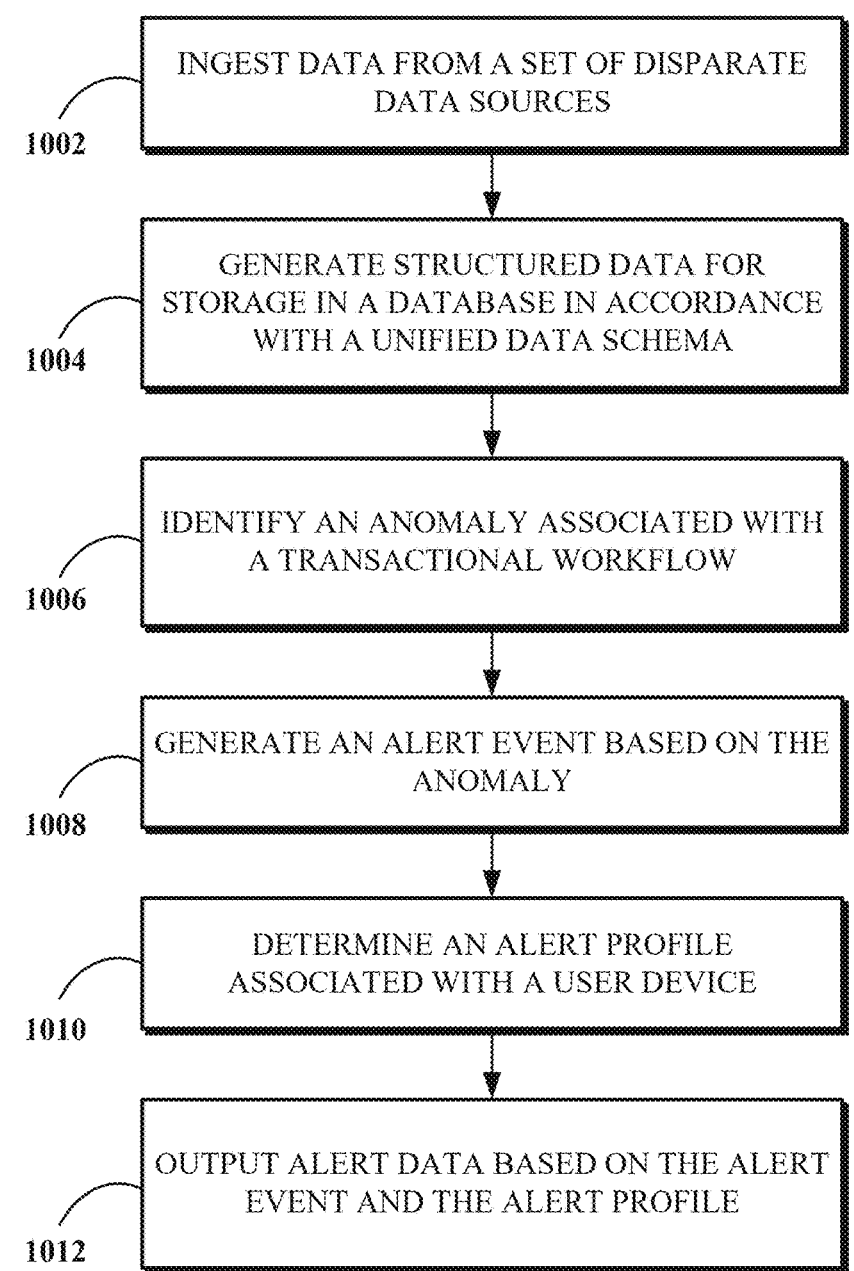

1002 — INGEST DATA FROM A SET OF DISPARATE DATA SOURCES

1004 — GENERATE STRUCTURED DATA FOR STORAGE IN A DATABASE IN ACCORDANCE WITH A UNIFIED DATA SCHEMA

1006 — IDENTIFY AN ANOMALY ASSOCIATED WITH A TRANSACTIONAL WORKFLOW

1008 — GENERATE AN ALERT EVENT BASED ON THE ANOMALY

1010 — DETERMINE AN ALERT PROFILE ASSOCIATED WITH A USER DEVICE

1012 — OUTPUT ALERT DATA BASED ON THE ALERT EVENT AND THE ALERT PROFILE

GENERATE FIRST DATA PROFILE CONTENT

1102

GENERATE SECOND DATA PROFILE CONTENT

1104

IDENTIFY SCHEMA MATCHING CONTENT

1106

GENERATE TRANSFORMED DATA

1108

STORE THE TRANSFORMED DATA WITHIN A DATABASE OF THE AI SYSTEM

1110

ARTIFICIAL INTELLIGENCE SYSTEM FOR PROCESSING DATA FROM DISPARATE DATA SOURCES

FIELD

The present disclosure relates to artificial intelligence systems, and more particularly to an artificial intelligence based system for providing alerts based on an aggregation of data from disparate data sources.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 10 is a flowchart of an example of a technique associated with providing alerts associated with healthcare financial workflows.

DETAILED DESCRIPTION

Figure 1A:
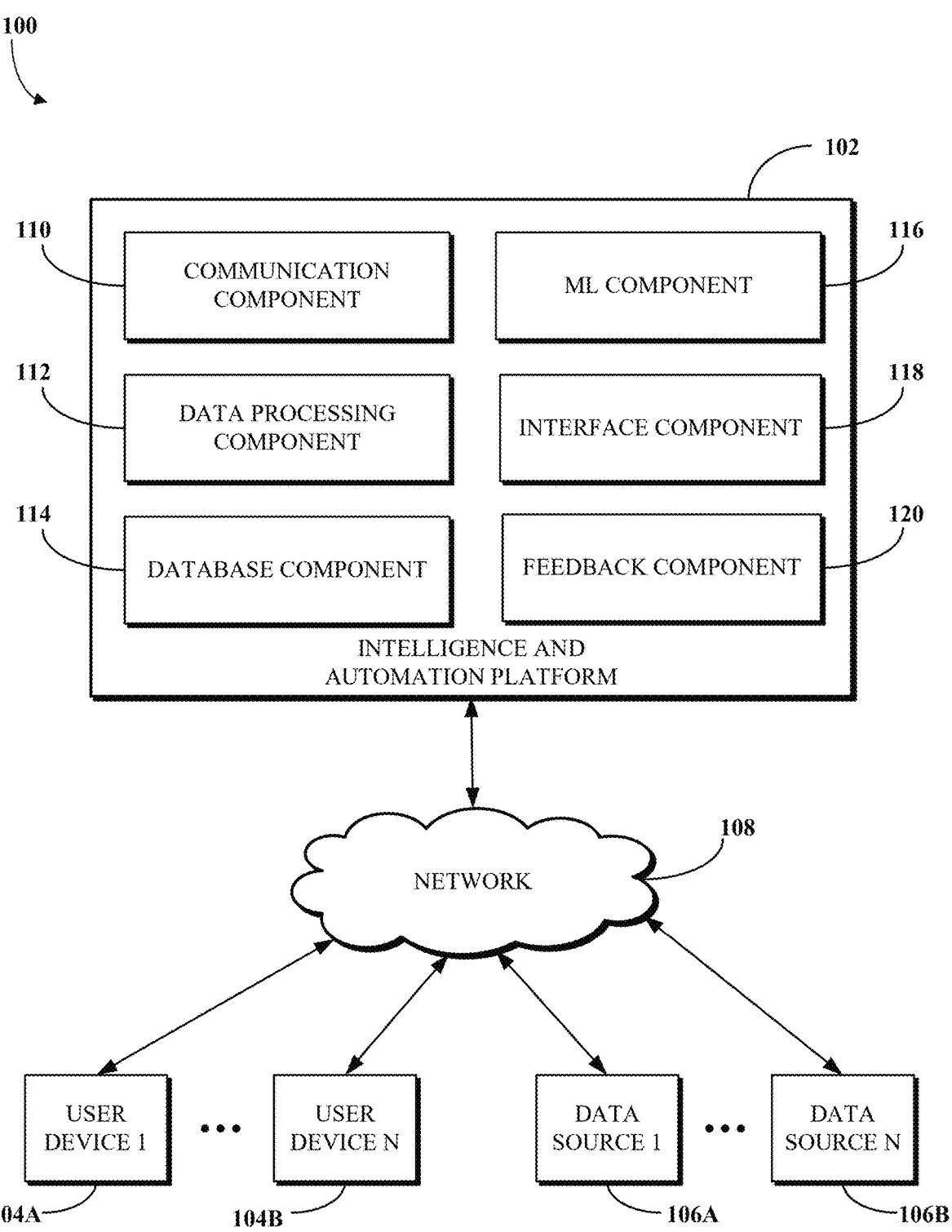
FIG. 1A is a block diagram of an example of an artificial intelligence system.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Aspects and examples generally include a method, apparatus, network node, system, computer program product, non-transitory computer-readable medium, computing device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of signals or data may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of an artificial intelligence (AI) system will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Data from disparate sources in healthcare revenue cycle management presents significant challenges due to the inherent differences in data structure, format, and content across various systems. Each data source may have its own unique schema, data types, and naming conventions, making it difficult to seamlessly integrate and analyze information across platforms. For example, an electronic health record (EHR) system may store patient demographic information and clinical data in a format optimized for healthcare delivery, while a practice management system may focus on scheduling and billing data with a different organizational structure. Clearinghouse data may include claim submission and response information in yet another format, while payer portals may provide remittance advice and payment data in their own proprietary structure.

Merging this diverse data is complicated by several factors. Inconsistencies in data quality, completeness, and accuracy across sources can lead to conflicts and discrepancies that need to be resolved. Temporal misalignments may occur when different systems update information at varying frequencies or with different time stamps. Additionally, the semantic interpretation of data fields may vary between systems, requiring careful mapping and transformation to ensure consistent meaning across the unified dataset.

The traditional approach to revenue cycle management often involves manual processes and rule-based systems that struggle to keep pace with the dynamic nature of healthcare billing. These systems are limited in their ability to detect subtle changes in payer adjudication practices, leading to increased claim denials and delayed payments. Furthermore, the sheer volume of claims processed by healthcare organizations makes it challenging for human operators to efficiently prioritize and manage workloads, resulting in suboptimal resource allocation and missed opportunities for revenue capture. The lack of real-time insights and predictive capabilities in existing solutions leaves healthcare providers reactive rather than proactive in addressing revenue cycle issues, potentially costing them millions of dollars in uncollected revenue annually.

Another significant challenge in the current healthcare revenue cycle landscape is the difficulty in leveraging data across multiple provider groups to gain broader insights and improve overall system performance. Existing solutions typically operate in isolation, focusing on individual healthcare organizations without the ability to harness network effects or shared learning across the industry. This limitation prevents healthcare providers from benefiting from the collective intelligence that could be derived from analyzing patterns and trends across a wider dataset. Additionally, the absence of sophisticated machine learning and artificial intelligence capabilities in many current systems means that healthcare organizations are unable to fully capitalize on the wealth of data at their disposal to drive continuous improvement in their revenue cycle processes.

Implementations of this disclosure address problems such as these by providing an AI system configured to ingest data of disparate formats, automatically transform that data into a unified format, and use the transformed data to provide intelligent alerts and workflow automations. For example, the AI system may automatically detect the computer storage format of incoming data and dynamically apply appropriate parsing algorithms. This may involve real-time analysis of data structures, encoding schemes, and metadata to determine the most suitable processing approach. The AI system may perform data transformations that may involve multi-step pipelines that normalize, cleanse, and convert the data into a unified format optimized for machine learning and analytics. These transformations may include operations such as data type conversions, unit standardization, code set mapping, and semantic reconciliation across different terminologies. In some implementations, the AI system may utilize parallel processing techniques to handle large volumes of data efficiently, distributing computational tasks across multiple computing devices.

The AI system described herein may employ a flexible and scalable architecture that enables it to ingest, process, and analyze vast amounts of heterogeneous data from multiple sources across the healthcare operation cycle ecosystem. Unlike conventional AI systems that often rely on predefined data models and rigid feature sets, the AI system described herein may utilize advanced machine learning techniques, such as deep neural networks and ensemble methods, to automatically discover complex patterns and relationships within the data. The system's ability to perform unsupervised learning and feature extraction may allow it to identify latent variables and correlations that human experts or traditional rule-based systems might overlook. By leveraging techniques such as transfer learning and multi-task learning, the AI system may efficiently adapt to new data sources and domains without requiring human-directed retraining. This adaptability may enable the AI system to continuously expand its knowledge base and improve its predictive capabilities as it encounters new data patterns and scenarios. The AI system may also incorporate a hierarchical attention mechanism that can dynamically focus on relevant data elements across different timescales and granularities, potentially allowing it to detect subtle anomalies and predict future events based on a holistic analysis of the entire operation cycle ecosystem.

Some implementations may involve an AI system that performs data profiling, schema matching, and data transformation operations on data from multiple sources. The AI system may use an automated machine-learning-based (ML-based) data profiling tool to analyze data from different sources and generate data profile information identifying schema information for each source. An ML component may perform a schema matching operation to identify matches between schemas from different sources.

Based on the schema matching results, an ML-based data transformation component may convert source data into a unified format aligned with a standardized data schema. This transformation process may involve complex operations such as standardizing medical code formats, resolving inconsistencies in units of measurement, and harmonizing semantic interpretations across different systems. The AI system may also incorporate advanced entity resolution techniques, using probabilistic matching algorithms to link patient records or claims data across disparate systems, even in the absence of perfect identifier matches. Additionally, the system may employ machine-learning-powered (ML-powered) data cleaning and completion tools to address data quality issues, correct anomalies, and infer missing information based on historical trends or similarity analyses.

The transformed and unified data may be stored in a database optimized for healthcare revenue cycle analytics. An ML-based data management component may oversee data consistency, versioning, and quality within this database, ensuring the integrity and reliability of the unified dataset. The system may also implement AI-powered application programming interfaces (APIs) to facilitate ongoing data flows between the AI system and various data sources, enabling real-time updates and synchronization. This comprehensive approach to data integration and transformation may provide healthcare organizations with a robust foundation for advanced analytics, predictive modeling, and automated decision-making in revenue cycle management, addressing the technical limitations of traditional, siloed systems.

For example, the AI system's advanced data ingestion and unification capabilities enable it to detect anomalies with unprecedented effectiveness by operating across traditionally siloed data sources and formats. By employing sophisticated machine learning models and natural language processing techniques, the AI system may harmonize diverse data types such as structured claim information, unstructured clinical notes, and semi-structured payer correspondence into a unified data schema. This comprehensive approach allows the AI system to uncover complex, multidimensional anomalies that span across different aspects of the revenue cycle. For example, the AI system may identify subtle correlations between specific provider documentation patterns, claim coding practices, and payer-specific adjudication tendencies that consistently lead to denials. In contrast, conventional approaches often struggle to detect such nuanced anomalies effectively because they are typically limited to analyzing data within individual silos or pre-defined rule sets. These traditional methods may miss important contextual information and fail to recognize patterns that emerge only when diverse data sources are analyzed holistically. By breaking down these data barriers, the AI system may provide healthcare organizations with a more complete and accurate picture of their revenue cycle performance, enabling them to proactively address issues that were previously invisible or difficult to detect.

The AI system may be configured to perform data collection, gathering relevant healthcare billing data such as claims, remittance advice, and electronic data interchange (EDI) files. This data undergoes processing, where it is cleaned, organized, and prepared for use in model training. Using historical billing data, the AI system may train algorithms to identify patterns, recognize trends, and detect anomalies. Once trained, the models may be applied to new or real-time data to generate insights, predictions, and actionable decisions. For example, ML applications in healthcare billing include fraud detection and improving revenue cycle management (RCM) processes by enhancing claim submissions and preventing denials.

Natural Language Processing (NLP) may enable the AI system to understand and interpret human language within healthcare workflows. By analyzing textual data such as claim codes, denial messages, and documentation, NLP can streamline tasks like categorizing denial reasons and identifying root causes of errors. This improves efficiency in addressing billing issues and reduces manual intervention.

The AI system may employ various types of models to optimize workflows. Supervised learning models are trained on labeled healthcare billing data, such as claims with known outcomes, to predict results like denial probabilities or claim accuracy. For example, supervised learning may improve claim submissions by learning patterns that lead to successful claims and identifying fields that contribute to denials. In contrast, unsupervised learning models may be used to analyze unlabeled data to detect patterns, groupings, or anomalies. These models can identify unexpected trends in remittance advice or cluster claims by similarities to optimize workflows and detect outliers. Reinforcement learning models may optimize decision-making through a process of interaction and feedback. The AI system may learn from actions taken within the billing workflow and adjust strategies based on positive or negative outcomes, such as improving alert thresholds or prioritizing worklist tasks. Generative AI (GenAI), which includes Large Language Models (LLMs), may enable the AI system to generate new content by learning patterns from existing data. LLMs can summarize claims data, interpret denial codes, and propose resolutions, further enhancing system intelligence.

In some implementations, the AI system may operate through a three-tier process to identify, predict, and resolve billing issues. First, descriptive analytics may identify problems after they occur by analyzing claim data for anomalies or trends such as patterns of denials. The AI system may generate alerts that highlight discrepancies and provides insights into root causes across the revenue cycle workflow.

In the second tier, predictive analytics may help prevent issues before they arise. For example, predictive denial models may assess claims prior to submission to determine their likelihood of being denied. The AI system may perform pre-claim checks, including patient eligibility verification, provider roster validation, data quality checks (e.g., zip code formatting), and coding assessments for ICD/CPT accuracy, modifiers, and units. By analyzing claims data and identifying patterns, the AI system may return specific reasons why similar claims were denied, allowing organizations to take corrective action before submission. The predictive models also may enable revenue forecasting and provide expected payout estimations for individual claims. Integration with electronic health record (EHR) systems may further enhance these capabilities by holding claims for review prior to submission, optimizing claim accuracy, and preventing denials.

The third tier involves prescriptive analytics, which generates actionable recommendations to resolve billing issues and automate repetitive tasks. For example, the AI system may categorize denial codes, such as Claim Adjustment Reason Codes (CARCs) and Remittance Advice Remark Codes (RARCs), into clear recommendations for resolution. The AI system also may automate corrections, prioritizes worklist assignments, and recommend actions to improve workflows. By capturing feedback on the actions taken, the AI system may continually learn and improve its recommendations.

The AI system may establish a set of data flows associated with a set of data sources, each having a different data schema, and performs a transformation operation using machine learning models to structure the data according to a unified data schema. As used herein, the term "data sources" includes, but is not limited to, EHR systems, practice management systems, clearinghouses, payer portals, and financial systems. The unified data schema may allow for comprehensive analysis across previously siloed data, enabling healthcare providers to gain a holistic view of their revenue cycle. As used herein, the term "unified data schema" refers to a standardized data schema that allows for comprehensive analysis across previously siloed data sources. For example, the unified data schema may include mappings of fields like "patient id" from an EHR system to "member_number" in a payer portal, enabling cross-system data analysis.

The AI system may perform data integration and normalization from multiple healthcare information technology (IT) systems using probabilistic matching techniques. As used herein, "probabilistic matching" refers to algorithms that determine the likelihood that records from different sources refer to the same entity, even when unique identifiers are not available. For example, the AI system may use a combination of name, date of birth, and address to match patient records across systems with a certain confidence level.

The AI system may perform anomaly detection operations on the structured data using machine learning models to identify anomalies associated with claims, denials, payments, reimbursements, submissions, or payment histories. As used herein, an "anomaly" refers to any unusual pattern, trend, or deviation from expected behavior in the revenue cycle data. The AI system may generate alert events based on these anomalies and output alert data to user devices based on customized alert profiles. The term "alert profile" includes, but is not limited to, user-specific settings that determine which types of alerts are displayed and how they are prioritized. This approach may enable healthcare providers to proactively address revenue cycle issues and optimize their financial performance.

For example, the AI system may generate alerts to highlight discrepancies and provide insights into root causes across the revenue cycle workflow. As used herein, an "alert" (referred to herein, interchangeably as an "alert event") refers to a notification of an anomaly or issue, which may be delivered through various channels such as email, SMS, or in-app notifications. The AI system may output alert data configured to cause a user interface of a user device to present a user interface element associated with the alert event. This user interface element may include a selectable option configured to cause the user interface to present information associated with the anomaly. For example, an alert may notify a billing manager of an unusual spike in claim denials for a particular procedure code, with the option to view detailed analytics on the affected claims.

The AI system may incorporate reinforcement learning that uses feedback from human billers to continuously improve its recommendations and automated actions. In some implementations, the AI system employs predictive modeling to forecast claim denials and payment timelines, enabling proactive interventions. For instance, the AI system may predict that a certain type of claim has a high likelihood of denial based on historical patterns and recommend presubmission review.

The AI system may leverage data across multiple provider groups to harness network effects and shared learning. As used herein, "network effects" refer to the improved performance and accuracy of the system as more healthcare providers contribute data. The AI system may utilize ML models trained on this broader dataset to identify claim structure patterns and generate more accurate anomaly detection models. Additionally, the AI system may organize metrics into metric groups, with each group associated with a different metric type. The term "metric group" includes, but is not limited to, collections of related financial or operational metrics such as denial rates, accounts receivable aging, or reimbursement rates. By decoupling individual metrics from metric groups, the system may provide flexibility in analyzing and reporting on revenue cycle performance across various dimensions.

The AI system's ability to detect anomalies that were previously undetectable stems from its comprehensive integration and analysis of data from multiple disparate sources. By leveraging ML models trained on a unified data schema, the AI system may identify subtle patterns and correlations that would be impossible to detect when examining each data source in isolation. For example, the AI system may uncover anomalies related to specific combinations of diagnosis codes, procedure codes, and payer policies that consistently lead to claim denials. These complex relationships may not be apparent when looking at claims data, clinical data, or payer data separately, but become visible when analyzed holistically. This enhanced anomaly detection capability may allow healthcare providers to address previously hidden issues in their revenue cycle, potentially reducing denial rates and improving overall financial performance.

The proactive nature of the AI system's anomaly detection is achieved through its real-time data processing and predictive analytics capabilities. Instead of relying on retrospective analysis of historical data, the AI system may continually monitor incoming data streams and apply ML models to identify potential issues before they escalate. For instance, the AI system may detect a slight increase in the time between claim submission and payment for a particular payer, which could indicate a change in their adjudication process. By alerting healthcare providers to this trend early, the AI system may enable them to investigate and address the issue proactively, potentially preventing a more significant disruption to their cash flow. This proactive approach may lead to faster resolution of revenue cycle issues, improved operational efficiency, and a more stable financial position for healthcare organizations.

The benefits of these advanced anomaly detection capabilities may be multifaceted. By identifying previously undetectable anomalies, healthcare providers may uncover new opportunities for process improvement and revenue optimization. This may lead to reduced revenue leakage, improved claim acceptance rates, and more accurate forecasting of cash flows. The proactive nature of the system's anomaly detection may result in faster issue resolution, minimized financial impact of revenue cycle disruptions, and improved resource allocation. Additionally, the AI system's ability to learn and adapt over time means that its anomaly detection capabilities may continually improve, providing healthcare organizations with an increasingly powerful tool for managing their revenue cycle and staying ahead of emerging challenges in the complex healthcare billing landscape.

The AI system may implement robust data privacy and security measures to ensure compliance with data protection regulations. The AI system may employ advanced encryption techniques for data at rest and in transit, utilizing industry-standard protocols to safeguard sensitive patient and financial information. Access controls and user authentication mechanisms may be implemented to ensure that only authorized personnel can view or modify specific data sets. The AI system may also incorporate data anonymization and pseudonymization techniques when processing large datasets for analytics, reducing the risk of individual patient identification. Regular security audits and vulnerability assessments may be conducted to identify and address potential weaknesses in the system's infrastructure. Additionally, the AI system may include features for data retention and deletion in accordance with legal requirements and organizational policies.

FIG. 1A is a block diagram of an example of an AI system 100, which can be, or include, a distributed computing system, a cloud computing system, and/or a clustered computing system, among other examples. As shown, the AI system 100 includes an intelligence and automation platform 102, user devices 104 (shown as user device 1 104A and user device N 104B), and data sources 106 (shown as data source 1 106A and data source 106B), communicatively coupled by a network 108. The AI system 100 may be implemented using a hardware environment that includes computer system components, such as general-purpose computers, dedicated computer systems, peripheral devices, components, and modules, and/or a combination thereof. In some implementations, the AI system 100 may be implemented within one or more cloud computing environments, where various components of the AI system 100 may be executed in various configurations, including in parallel. In some implementations, one or more components of the AI system 100 can be implemented using one computing device or a combination of several interconnected computing devices.

The user devices 104 may include any device that enables a user to interact with the AI system 100. The user devices 104 may include a mobile device, a tablet, a personal computer, a wearable device, or any other computing device. The user devices 104 may operate a suitable operating system, such as a desktop operating system, a mobile operating system, or a web browser. In some implementations, the user devices 104 may be implemented using one or more computing devices such as the computing device 200 illustrated with respect to FIG. 2.

The data sources 106 may include one or more computing devices configured to provide electronic data, electronic files, electronic signatures, electronic documents, or any other electronic data to the AI system 100 or to another aspect of the AI system 100. For example, the data sources 106 may be implemented within one or more cloud computing environments, where various components of the data sources 106 may be executed in various configurations, including in parallel. In some implementations, one or more components of the data sources 106 can be implemented using one computing device or a combination of several interconnected computing device such as the computing device 200 illustrated with respect to FIG. 2. The data sources 106 may include a cloud resource, a workstation, an EHR, a practice management system, a clearinghouse service, a payer portal, and/or a financial system, among other examples of data sources 106.

The network 108 may be a public communication network (e.g., the Internet, cellular data network, dialup connectivity, etc.), a private communications network (e.g., private LAN, leased line, etc.), or a combination of a public communications network and a private communications network. In some cases, the network 108 may include, and/or may communicate with, any one or more of a Bluetooth network, a near-field communication network, a satellite communication network, a wireless communication network, and/or any other communication network. The network 108 may include any combination of wired and/or wireless networks. The communication over the network 108 can traverse one or more of the Internet, a wide area network (WAN), a metropolitan area network (MAN), a local area network (LAN), a virtual private network (VPN), a wireless local area network (WLAN), a virtual private wireless network (VP), a radio access network, a mobile data network, a power distribution network, a satellite network, a plain old telephone system (POTS), and/or a cellular or third generation (3G) or fourth generation (4G) data network, among other examples, and/or any combination of the above.

As shown, the intelligence and automation platform 102 includes a communication component 110, a data processing component 112, a database component 114, an ML component 116, an interface component 118, and a feedback component 120. In some implementations, one or more of the communication component 110, the data processing component 112, the database component 114, the ML component 116, the interface component 118, and the feedback component 120 may be implemented using one computing device or a combination of several interconnected computing device such as the computing device 200 illustrated with respect to FIG. 2. In some implementations, two or more of the communication component 110, the data processing component 112, the database component 114, the ML component 116, the interface component 118, and the feedback component 120 may be combined into a single component.

The intelligence and automation platform 102 may serve as the core of the AI system 100, processing and analyzing healthcare revenue cycle data to provide actionable insights and automate various tasks. The platform 102 may be implemented using cloud computing infrastructure in some implementations, allowing for scalability and flexibility. In some implementations, the platform 102 could be deployed on-premises or in a hybrid cloud configuration, depending on the specific needs and regulatory requirements of healthcare providers.

The communication component 110 may manage the flow of information between the platform and external systems, including user devices 104 and data sources 106. This component may implement various communication protocols and data exchange standards specific to healthcare IT, such as HL7 FHIR or X12 EDI. In some embodiments, the communication component 110 may also support blockchain technology for enhanced data integrity and traceability in healthcare transactions.

The data processing component 112 may be responsible for ingesting, cleaning, and transforming the raw data received from various sources into a standardized format suitable for analysis. This component may employ data integration techniques, including probabilistic matching algorithms, to reconcile inconsistencies across different data sources. The data processing component 112 may utilize parallel processing frameworks, such as Apache Spark, to handle large volumes of healthcare data efficiently. In some implementations, this component may also incorporate NLP capabilities to extract meaningful information from unstructured clinical notes or payer correspondence.

The database component 114 may provide a unified data repository for the AI system 100, storing both raw and processed data in a structured manner. This component may utilize a combination of relational and NoSQL databases to accommodate the diverse types of healthcare data encountered in revenue cycle management. The database component 114 may implement data modeling techniques to represent complex relationships between various entities, such as patients, claims, providers, and payers. In some embodiments, the database component 114 may incorporate a data lake architecture to store and analyze large volumes of unstructured and semi-structured data.

The ML component 116 may be the analytical engine of the AI system 100, leveraging various machine learning algorithms to detect patterns, anomalies, and trends in healthcare revenue cycle data. ML is a subset of AI that focuses on the development of algorithms that allow computers to learn from data inputs and make predictions or decisions without explicit programming. ML leverages large datasets to identify patterns, make decisions, and improve over time based on experience. ML focuses on creating systems that can learn from data, adapt to new inputs, and generate predictions or actions.

For example, an ML component may be or include one or more ML models, ML algorithms, and/or ML systems including combinations of ML algorithms and ML models. An ML component may be implemented on any number of different hardware devices and may include one or more machine learning models. ML is a field of study that gives computers the ability to perform certain tasks without being explicitly programmed to perform those tasks. In traditional computing, a programmer would encode instructions (e.g., to solve a quadratic equation using the quadratic formula), and the computer would perform those exact instructions. In contrast, in ML, a computer can be provided with examples and be trained to perform a task such as prediction or classification, without the programmer encoding explicit instructions for the task. ML explores the study and construction of algorithms, also referred to herein as tools, models, and/or components, which may learn from existing data and make predictions about new data. Such ML tools operate by building a model from example training data in order to make data-driven predictions or decisions expressed as outputs or assessments. Although example embodiments are presented with respect to a few ML models, the principles presented herein may be applied to other ML models. In some example embodiments, different ML models may be used. ML models may include, for example, K-means clustering models, linear regression models, logistic regression (LR) models, Naive-Bayes models, random forest (RF) regression models, gradient boost models, neural networks (NN), matrix factorization models, large language models (LLMs), and/or support vector machines (SVMs), among other examples.

The ML component 116 may employ supervised learning techniques to predict claim denials, unsupervised learning for anomaly detection, and reinforcement learning to optimize billing workflows. The ML component 116 may utilize ensemble methods, combining multiple models to improve accuracy and robustness. In some implementations, the ML component 116 may also incorporate deep learning techniques, such as recurrent neural networks (RNNs), to analyze sequential data in claims processing.

The interface component 118 may provide the user-facing layer of the AI system 100, delivering insights and functionalities through intuitive dashboards, reports, and interactive visualizations. This component may implement responsive design principles to ensure a consistent user experience across various devices and screen sizes. The interface component 118 may utilize data visualization libraries, such as D3. js, to create dynamic and interactive representations of complex revenue cycle metrics. In some embodiments, the interface component 118 could incorporate augmented reality (AR) features to provide immersive data exploration experiences for healthcare finance professionals.

The feedback component 120 may play a role in the continuous improvement of the AI system 100 by capturing user interactions, preferences, and manual corrections. This component may implement mechanisms to collect both explicit feedback (e.g., user ratings) and implicit feedback (e.g., usage patterns) to refine the system's algorithms and recommendations. The feedback component 120 may employ A/B testing frameworks to evaluate the effectiveness of different features or UI elements. In some implementations, this component could utilize sentiment analysis techniques to gauge user satisfaction and identify areas for improvement based on natural language feedback.

Figure 1B:
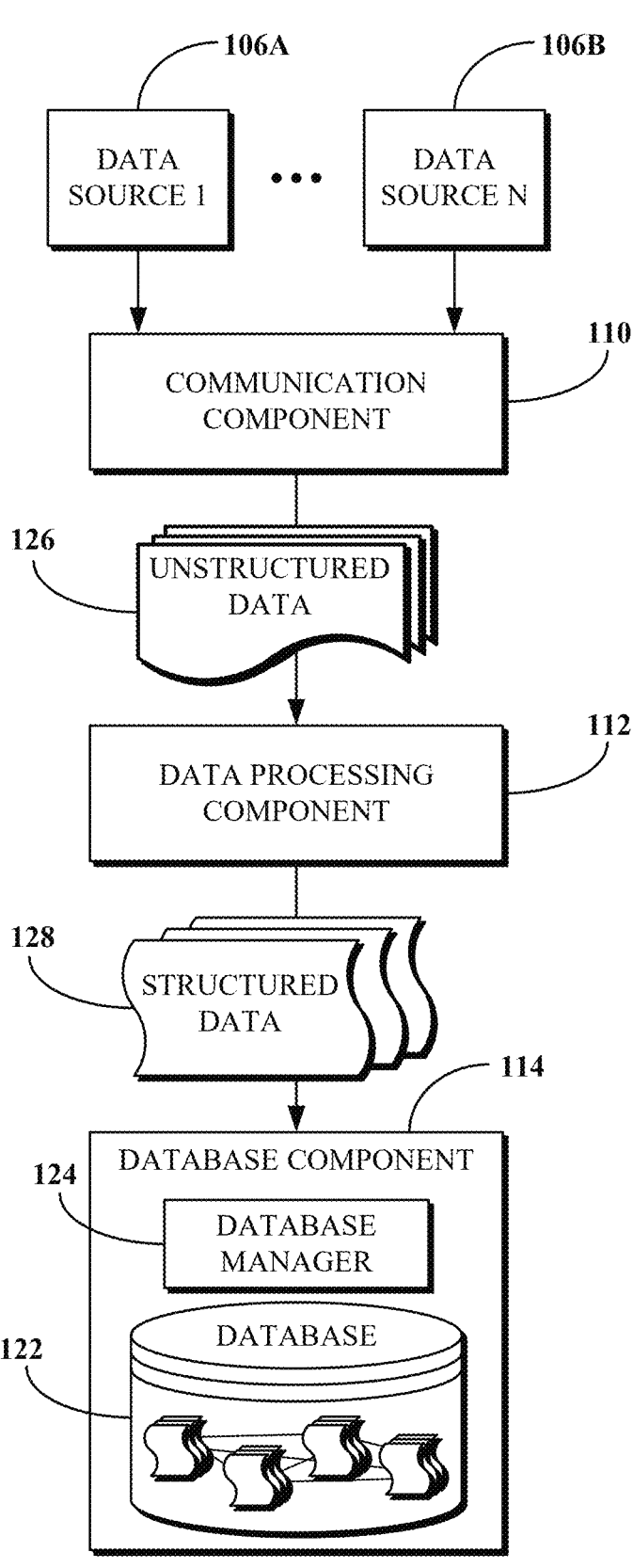
FIG. 1B is a block schematic diagram associated with processing data from disparate data sources.

FIG. 1B illustrates a block schematic diagram associated with processing data from disparate data sources, highlighting the data flow and transformation processes within the AI system 100. The communication component 110 receives data from multiple sources, including data source 106A and data source 106B, and outputs unstructured data 126. This unstructured data may include a mix of structured (e.g., claims data in standardized formats) and unstructured (e.g., clinical notes, denial reasons) information from various healthcare IT systems.

The data processing component 112 takes the unstructured data 126 as input and performs a series of transformations to generate structured data 128. This process may involve data cleaning, normalization, and enrichment tasks tailored to healthcare revenue cycle management. The data processing component 112 may employ entity resolution techniques to reconcile patient and provider information across different systems, ensuring data consistency and accuracy.

The structured data 128 is then passed to the database component 114, which manages its storage and retrieval. The database component 114 includes a database manager 124 that oversees the organization and indexing of data within the database 122. This architecture may allow for efficient querying and analysis of large-scale healthcare financial data, supporting both real-time operational needs and long-term analytical requirements.

Figure 1C:
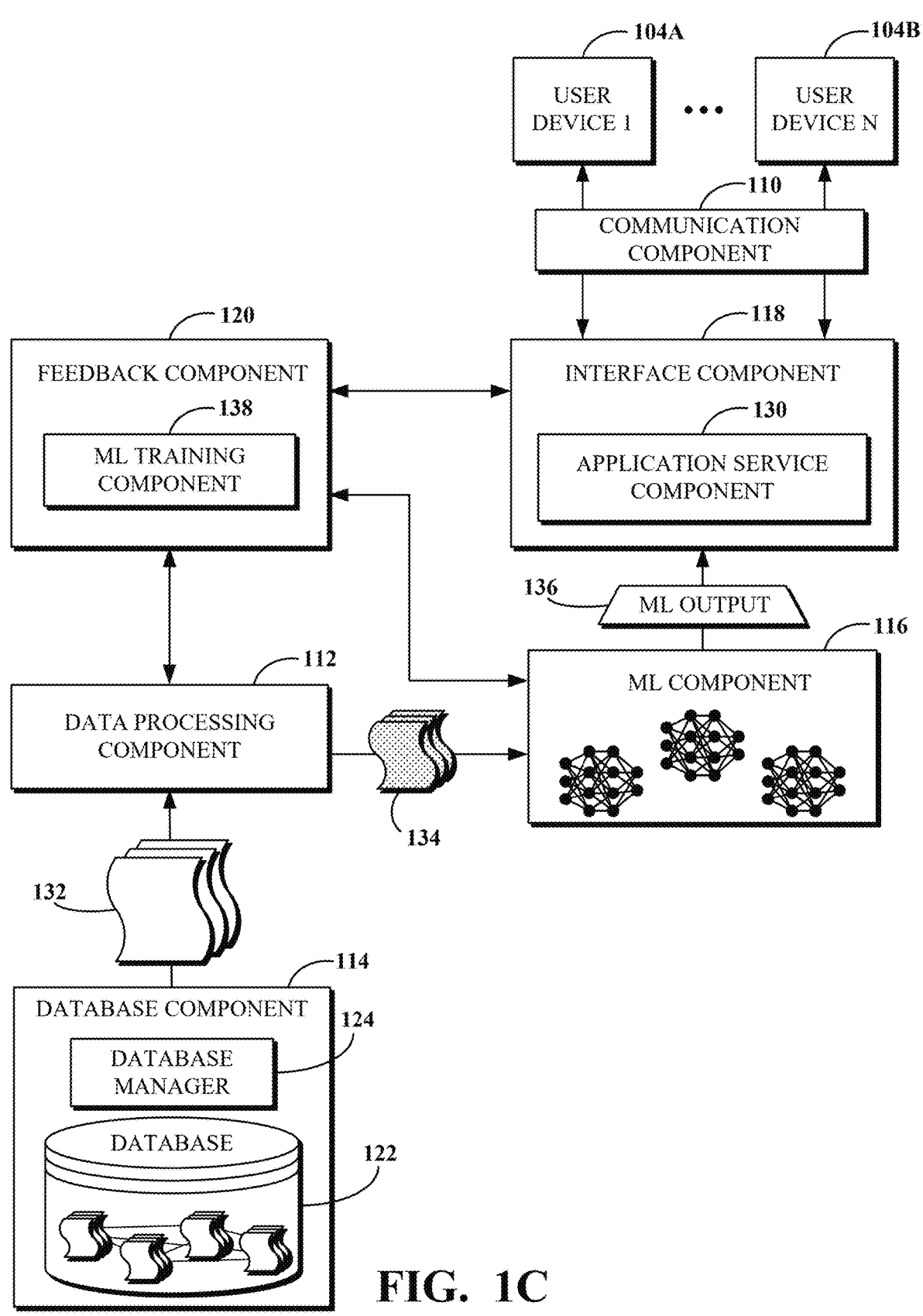
FIG. 1C is a block schematic diagram associated with processing data to provide intelligent informational services.

FIG. 1C is a block schematic diagram associated with processing data to provide intelligent informational services. FIG. 1C provides a more detailed view of the data processing and machine learning pipeline within the AI system 100. The system interacts with multiple user devices (104A, 104B) through the communication component 110, which interfaces with the interface component 118. The interface component 118 contains an application service component 130, which manages the business logic and user interactions of the AI system.

The data processing component 112 retrieves data 132 from the database component 114 and generates processed data 134. This processed data serves as input for the ML component 116, which applies various machine learning algorithms to produce ML output 136. The ML output, which may include predictions, anomaly detections, or optimized workflows, is then provided to the application service component 130 for presentation to users.

A feature of the AI system 100 may be its ability to continuously learn and improve. The feedback component 120 contains an ML training component 138 that interacts with both the data processing component 112 and the interface component 118. This feedback loop may enable the system to adapt to changing patterns in healthcare billing and user preferences, enhancing its accuracy and relevance over time.

The ML component 116 may be configured to perform various types of training to enhance its capabilities in healthcare revenue cycle management. In some implementations, the ML component 116 may utilize supervised learning techniques to train models for predicting claim denials, reimbursement amounts, and other metrics. This training process may involve feeding the models large datasets of historical claims data, including features such as patient demographics, diagnosis codes, procedure codes, provider information, and payer details, along with the corresponding outcomes (e.g., approved, denied, partially paid).

To create training datasets, the AI system 100 may aggregate data from multiple healthcare providers across various specialties and geographical regions. This comprehensive dataset may include information from electronic health records (EHRs), practice management systems, clearinghouses, and payer portals. In some cases, the system may employ data augmentation techniques to enhance the quality and quantity of training data. For instance, the AI system 100 may use generative adversarial networks (GANs) to create synthetic medical claims that mimic the characteristics of real claims, helping to balance datasets for rare conditions or uncommon billing scenarios.

The ML component 116 may also implement unsupervised learning algorithms to detect anomalies and patterns in the revenue cycle data without relying on labeled outcomes. These models may be trained on large volumes of unlabeled claims data to identify unusual trends, potential fraud, or emerging issues in payer behavior. The training process for unsupervised models may involve techniques such as clustering, dimensionality reduction, and anomaly detection algorithms like isolation forests or autoencoders.

In some implementations, the ML component 116 may employ reinforcement learning techniques to optimize decision-making processes in revenue cycle management. This training approach may involve creating a simulated environment that mimics the complexities of healthcare billing, where the model learns to make optimal decisions through trial and error. The reinforcement learning models may be trained to maximize revenue capture, minimize denial rates, or optimize resource allocation in billing workflows.

The AI system 100 may implement dynamic retraining mechanisms to ensure that the ML models remain accurate and relevant in the face of changing healthcare regulations and payer policies. One approach to dynamic retraining may involve implementing a sliding window technique, where the system continuously updates the training dataset with the most recent claims data while gradually phasing out older data. This approach may help the models adapt to evolving patterns in claim adjudication and payer behavior.

Another method for dynamic retraining may leverage federated learning techniques, allowing the AI system 100 to learn from data across multiple healthcare providers without directly sharing sensitive patient or claim information. In this approach, model updates may be distributed to individual healthcare providers, who then train the model on their local data and return only the updated model parameters. The system may then aggregate these updates to improve the global model, potentially capturing nuanced patterns that may not be apparent in any single provider's data alone.

The creation of retraining datasets may involve a combination of automated data collection and human-in-the-loop processes. The AI system 100 may automatically gather new claims data, remittance advice, and payer correspondence as they become available. In some implementations, the system may incorporate feedback from human billers and revenue cycle managers, capturing information about successful appeals, coding corrections, and other manual interventions that lead to positive claim outcomes. This feedback may be used to enrich the retraining datasets, helping the models learn from expert knowledge and adapt to complex edge cases.

In some implementations, the ML component 116 may utilize active learning techniques to identify the most informative samples for retraining. This approach may involve selecting claims that the current model is uncertain about or that represent edge cases in the data distribution. For example, if the model consistently misclassifies certain types of claims or struggles with specific payer-provider combinations, these cases may be prioritized in the retraining dataset. The active learning approach may help optimize the retraining process by focusing on the most challenging and informative examples, potentially improving model performance more efficiently than random sampling of new data.

Figure 1D:
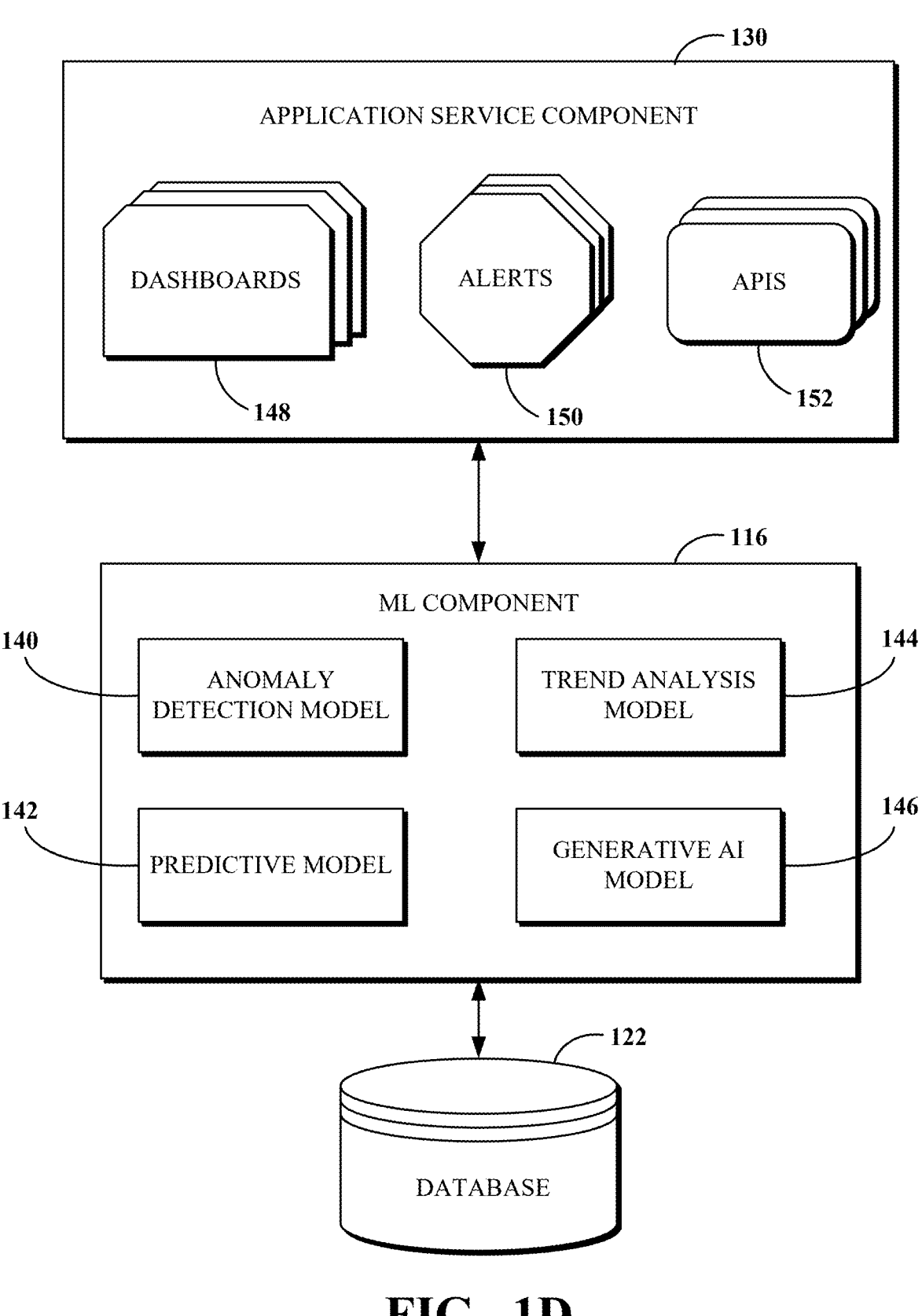
FIG. 1D is a block diagram of another example of an artificial intelligence system.

FIG. 1D illustrates the machine learning architecture of the AI system 100 in greater detail. The application service component 130 provides three main interfaces: dashboards 148, alerts 150, and APIs 152. These interfaces may enable users to interact with the system's insights and functionalities in various ways, from visual analytics to programmatic integrations.

The ML component 116 houses multiple specialized models, each addressing specific aspects of healthcare revenue cycle management. The anomaly detection model 140 identifies unusual patterns in claims data, helping to flag potential issues before they impact revenue. The predictive model 142 forecasts outcomes such as claim denials or payment timelines, enabling proactive interventions. The trend analysis model 144 uncovers long-term patterns in revenue cycle performance, supporting strategic decision-making. The generative AI model 146 may be used for tasks such as automated report generation or natural language interactions with the system.

This AI architecture may provide a solution to technical challenges of fragmented and inefficient healthcare revenue cycle management. By integrating data from multiple sources, applying machine learning techniques, and providing actionable insights through intuitive interfaces, the AI system 100 may enable healthcare providers to optimize their financial operations, reduce claim denials, and improve overall revenue capture. The system's ability to learn and adapt may allow it to remain effective in the face of evolving healthcare regulations and payer policies, providing advantages for healthcare organizations that implement this technology.

Figure 2:
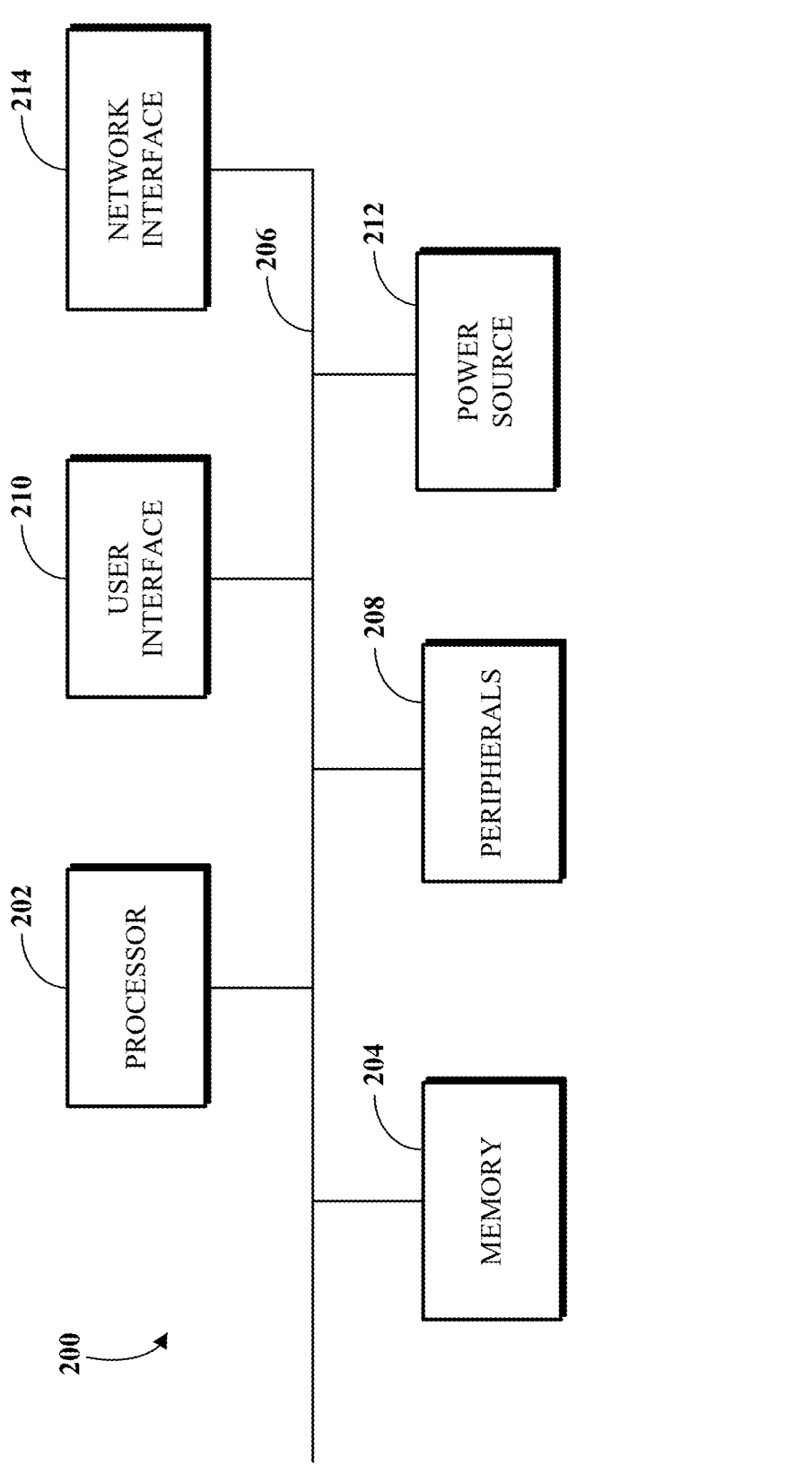
FIG. 2 is a block diagram of a computing device.

FIG. 2 is a block diagram of a computing device 200. In some implementations, the computing device 200 may implement one or more of the intelligence and automation platform 102, the user devices 104, and the data sources 106 of the AI system 100 shown in FIG. 1A.

The computing device 200 includes a processor 202, a memory 204, a bus 206, peripherals 208, a user interface 210, a power source 212 and a network interface 214. In some implementations, the computing device 200 may include any number of other components. The bus 206 may facilitate communication between two or more of the processor, the memory 204, the peripherals 208, the user interface 210, the power source 212 and the network interface 214.

The processor 202 (referred to herein interchangeably as "processing circuitry") may include a central processing unit, such as a microprocessor. The processor 202 may include single or multiple processors having single or multiple processing cores. In some implementations, the processor 202 may include another type of device, or multiple devices, configured for manipulating or processing information. One or more operations of the processor 202 may be distributed across multiple devices or units that may be coupled directly or across a local area network or other suitable type of network. The processor 202 may include a cache, or cache memory, for local storage of operating data or instructions.

The memory 204 may include one or more memory components, each of which may be volatile memory or non-volatile memory. For example, volatile memory may be random access memory (RAM) (e.g., a DRAM module, such as DDR SDRAM). In another example, non-volatile memory may be a disk drive, a solid state drive, flash memory, or phase-change memory. In some implementations, the memory 204 may be distributed across multiple devices. For example, the memory 204 may include network-based memory or memory in multiple clients or servers performing the operations of those multiple devices.

The memory 204 may include data for access by the processor 202. For example, the memory 204 may include executable instructions that may be executed by the processor 202. Reference to execution, by the processor 202, of executable instructions stored in the memory 204 may include a reference to execution by multiple processors of the same or different instructions, which may be stored in, or across, one or more memories. The executable instructions may correspond to one or more application programs, which may be loaded or copied, in whole or in part, from non-volatile memory to volatile memory to be executed by the processor 202. For example, the executable instructions may include instructions for performing some or all of the techniques of this disclosure. The data stored in the memory may include user data, database data (e.g., database catalogs or dictionaries), or the like. In some implementations, the data may include functional programs, such as a web browser, a web server, a database server, another program, or a combination thereof.

The processor 202 may implement one or more techniques or perform one or more operations associated with machine-learning based clinical workflows, as described in more detail elsewhere herein. For example, the processor 202 may perform or direct operations of, for example, technique 1000 of FIG. 10, technique 1100 of FIG. 11, technique 1200 of FIG. 12, or other techniques as described herein (alone or in conjunction with one or more other processors). The memory 204 may store data and program codes for the computing device 200. In some examples, the memory 204 may include a non-transitory computer-readable medium storing a set of instructions (for example, code or program code). The memory 204 may include one or more memories, such as a single memory or multiple different memories (of the same type or of different types). For example, the set of instructions, when executed (for example, directly, or after compiling, converting, or interpreting) by the processor 202, may cause the processor to cause the computing device 200 to perform technique 1000 of FIG. 10, technique 1100 of FIG. 11, technique 1200 of FIG. 12, or other techniques as described herein. In some examples, executing instructions may include running the instructions, converting the instructions, compiling the instructions, and/or interpreting the instructions, among other examples.

The peripherals 208 may include one or more peripheral devices such as, for example, sensors, detectors, or other devices configured for obtaining data associated with the computing device 200, a user of the computing device 200, or the environment around the computing device 200. For example, the peripherals 208 may include a geolocation component, such as a global positioning system location unit. In another example, the peripherals may include a temperature sensor for measuring temperatures of components of the computing device 200, such as the processor 202. In some implementations, the computing device 200 may omit the peripherals 208.

The user interface 210 may include one or more input interfaces and/or output interfaces. An input interface may, for example, include a positional input device, such as a mouse, touchpad, touchscreen, or a keyboard, among other examples. An output interface may, for example, be a display, such as a liquid crystal display, a cathode-ray tube, or a light emitting diode display, among other examples.

The power source 212 may be configured to provide power to the computing device 200. For example, the power source 212 may include an interface to an external power distribution system. In another example, the power source 212 may include a battery. In some implementations, the computing device 200 may include or otherwise use multiple power sources.

The network interface 214 may facilitate communication via a network (e.g., the network 108 shown in FIG. 1A). The network interface 214 may include a wired network interface, a wireless network interface, or a combination thereof. The computing device 200 may communicate with other devices via the network interface 214 using one or more network protocols such as, for example, Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), or Z-Wave, among other examples.

Figure 3:
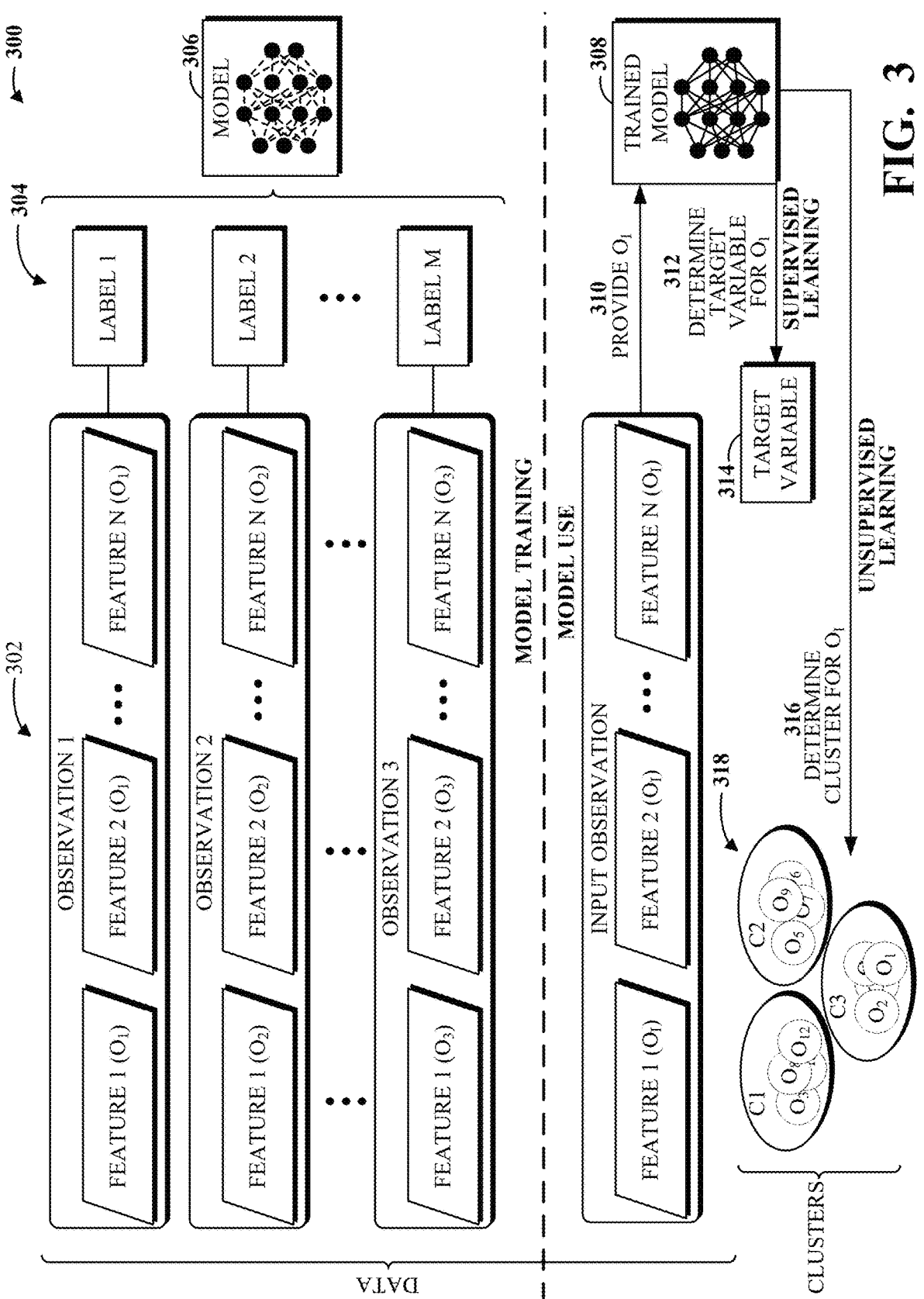
FIG. 3 is a block schematic diagram associated with machine learning.

FIG. 3 is a block schematic diagram associated with ML. Specifically, FIG. 3 is a diagram illustrating an example 300 of training and using an ML model. The ML model training and usage described herein may be performed using an AI system (e.g., the AI system 100 shown in FIG. 1A). The AI system may include or may be included in a computing device, a server, a cloud computing environment, and/or the like. The example 300 includes an observation dataset 302, labels 304, a model 306, a trained model 308, an input observation 310, operations 312 and 316, a target variable 314, and clusters 318 including a first cluster C1, a second cluster C2, and a third cluster C3.

The observation dataset 302 comprises a set of observations, each containing multiple features (FEATURE 1 (O1), FEATURE 2 (O2), etc.). This dataset serves as the foundation for training a machine learning model. In some embodiments, the observation dataset 302 may be obtained from historical healthcare claims data, including information such as patient demographics, diagnosis codes, procedure codes, and claim outcomes. Some implementations may incorporate data from electronic health records, practice management systems, or payer portals to enrich the observation dataset.

The features may include a set of variables, and a variable may be referred to as a feature. A specific observation may include a set of variable values (or feature values) corresponding to the set of variables. As an example, a feature set for a set of observations may include a first feature of feature 1 data, a second feature of feature 2 data, a third feature of feature 3 data, and so on. As shown, for a first observation, the first feature may have a value of feature 1 data 1, the second feature may have a value of feature 2 data 1, the third feature may have a value of feature 3 data 1, and so on. These features and feature values are provided as examples and may differ in other examples. In some implementations, the AI system may determine variables for a set of observations and/or variable values for a specific observation based on input received from the AI system. For example, the AI system may identify a feature set (e.g., one or more features and/or feature values) by extracting the feature set from structured data, by performing natural language processing to extract the features from unstructured data, by receiving input from an operator, and/or the like.

Labels 304 are associated with each observation in the dataset 302. These labels represent known outcomes or classifications for the training data. In the context of healthcare revenue cycle management, labels may indicate whether a claim was approved, denied, or partially paid. Some implementations may use labels to represent other outcomes, such as the likelihood of claim denial or the expected time to payment. A label may represent a variable having a numeric value, may represent a variable having a numeric value that falls within a range of values or has some discrete possible values, may represent a variable that is selectable from one of multiple options, may represent a variable having a Boolean value, and/or the like.

The target variable may represent a value that an ML model is being trained to predict, and the feature set may represent the variables that are input to a trained ML model to predict a value for the target variable. The set of observations may include target variable values (e.g., labels) so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a label. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

The model 306 represents the initial, untrained machine learning algorithm. This model may take various forms, such as a neural network, decision tree, random forest, or support vector machine. In some embodiments, the model 306 may be a combination of multiple algorithms, forming an ensemble model to improve overall performance. Some implementations may employ different model architectures based on the specific requirements of the healthcare revenue cycle management task at hand.

Through the training process, the model 306 is transformed into the trained model 308. This trained model has learned patterns and relationships from the observation dataset 302 and associated labels 304. In the context of the present disclosure, the trained model 308 may be capable of predicting claim outcomes, identifying potential denials, or detecting anomalies in billing patterns. Some embodiments may produce trained models specialized in other aspects of revenue cycle management, such as optimizing coding practices or predicting patient payment behavior.

The input observation 310 represents new, unseen data that is fed into the trained model 308 for analysis or prediction. In healthcare revenue cycle management, an input observation might be a newly submitted claim or a set of claims awaiting processing. The input observation 310 contains the same types of features as the training data but without known labels or outcomes. Some implementations may allow for real-time input of claim data as it is generated, enabling immediate analysis and decision support.

Operation 312 refers to the process of applying the trained model 308 to the input observation 310 to determine a target variable 314 for the input observation 310. This operation may involve various computational steps, depending on the type of model used. For example, in a neural network, operation 312 would involve forward propagation of the input data through the network layers. In a decision tree model, it would involve traversing the tree based on the input features. Some implementations may incorporate additional pre-processing steps or feature engineering techniques as part of operation 312 to optimize model performance.

The target variable 314 is the output produced by the trained model 308 after processing the input observation 310. In the context of healthcare revenue cycle management, the target variable 314 might represent a predicted probability of claim approval, an estimated payment amount, or a classification of the claim into different risk categories. Some implementations may generate multiple target variables simultaneously, providing a more comprehensive analysis of each claim or set of claims.

Operation 316 represents an unsupervised learning process in which a cluster is determined for the input observation 310. The clusters 318, including first cluster C1, second cluster C2, and third cluster C3, illustrate the model's ability to group similar observations together. In the context of healthcare revenue cycle management, these clusters might represent groups of claims with similar characteristics, denial patterns, or payment behaviors. For example, cluster C1 might contain claims likely to be approved without issue, cluster C2 might represent claims at high risk of denial, and cluster C3 could indicate claims requiring additional documentation. Some implementations may employ more sophisticated clustering techniques, such as hierarchical clustering or density-based clustering, to identify more nuanced patterns in the data.

The machine learning system depicted in FIG. 3 can be applied to various aspects of healthcare revenue cycle management beyond claim prediction and classification. For instance, it could be used to optimize billing workflows by identifying the most effective times or methods for submitting claims to different payers. The system could also be employed to detect potential fraud or abuse by identifying unusual patterns in claiming behavior that deviate significantly from established norms.

Another potential application of the machine learning system is in predicting patient payment behavior. By analyzing historical patient data, demographic information, and payment patterns, the system could help healthcare providers anticipate which patients are likely to pay their bills promptly, which might need payment plans, and which may require more aggressive collection efforts. This could lead to more personalized and effective financial counseling and billing strategies.

The machine learning system of the present disclosure is not limited to supervised learning approaches as depicted in FIG. 3. Some implementations may incorporate unsupervised learning techniques to discover hidden patterns in healthcare revenue cycle data without the need for labeled training data. For example, anomaly detection algorithms could be employed to identify unusual claims or billing practices that may warrant further investigation, even if they don't fit into predefined categories of known issues.

In some embodiments, the machine learning system may be extended to include reinforcement learning capabilities. This approach could be particularly useful in optimizing long-term revenue cycle strategies. For instance, a reinforcement learning model could learn to balance the trade-offs between aggressive claim submission (which might lead to more denials but faster payments) and more conservative approaches (which might have higher approval rates but slower cash flow). The model could adapt its strategies over time based on the observed outcomes and financial impact of different approaches.

Similar to human learning, RL trains neural networks through trial and error. Specifically, the neural network produces an output, receives feedback regarding this output, and then learns from the feedback. For instance, when finetuning a language model using reinforcement learning from human feedback (RLHF), the language model generates text and receives a score or reward from a human annotator, which reflects the quality of the text. The AI training software then employs RL to finetune the language model to generate outputs with high scores.

Reinforcement learning proves to be an advantageous and promising learning algorithm for neural networks because it allows learning from non-differentiable signals, which are incompatible with supervised learning. This capability enables the AI training software to learn from arbitrary feedback on a neural network's output. In the case of RLHF, the outputs generated by a language model can be scored according to any predefined principle. The AI training software then uses RL to learn from these scores, regardless of their definition.

Problems addressed via RL are typically structured in a consistent format. Specifically, an agent interacts with an environment, maintaining a state within this environment and producing actions that can alter the current state. As the agent interacts with the environment, it can receive both positive and negative rewards for its actions. The agent's objective is to maximize the rewards received, although not every action is associated with a reward. Rewards may have a long horizon, necessitating several correct, consecutive actions to generate any positive reward. In mathematical terms, RL may be described as a Markov decision process (MDP). An MDP includes states, actions, rewards, transitions, and a policy. States and actions have discrete values, while rewards are real numbers. In an MDP, a policy (referred to herein, interchangeably as a "policy model") takes a state as input and outputs a probability distribution over possible actions. Given this output, a decision can be made for the action to be taken from a current state, and the transition is then a function that outputs the next state based upon the prior state and chosen action. Using these components, the agent can interact with the environment in an iterative fashion to generate a trained policy.

Figure 4:
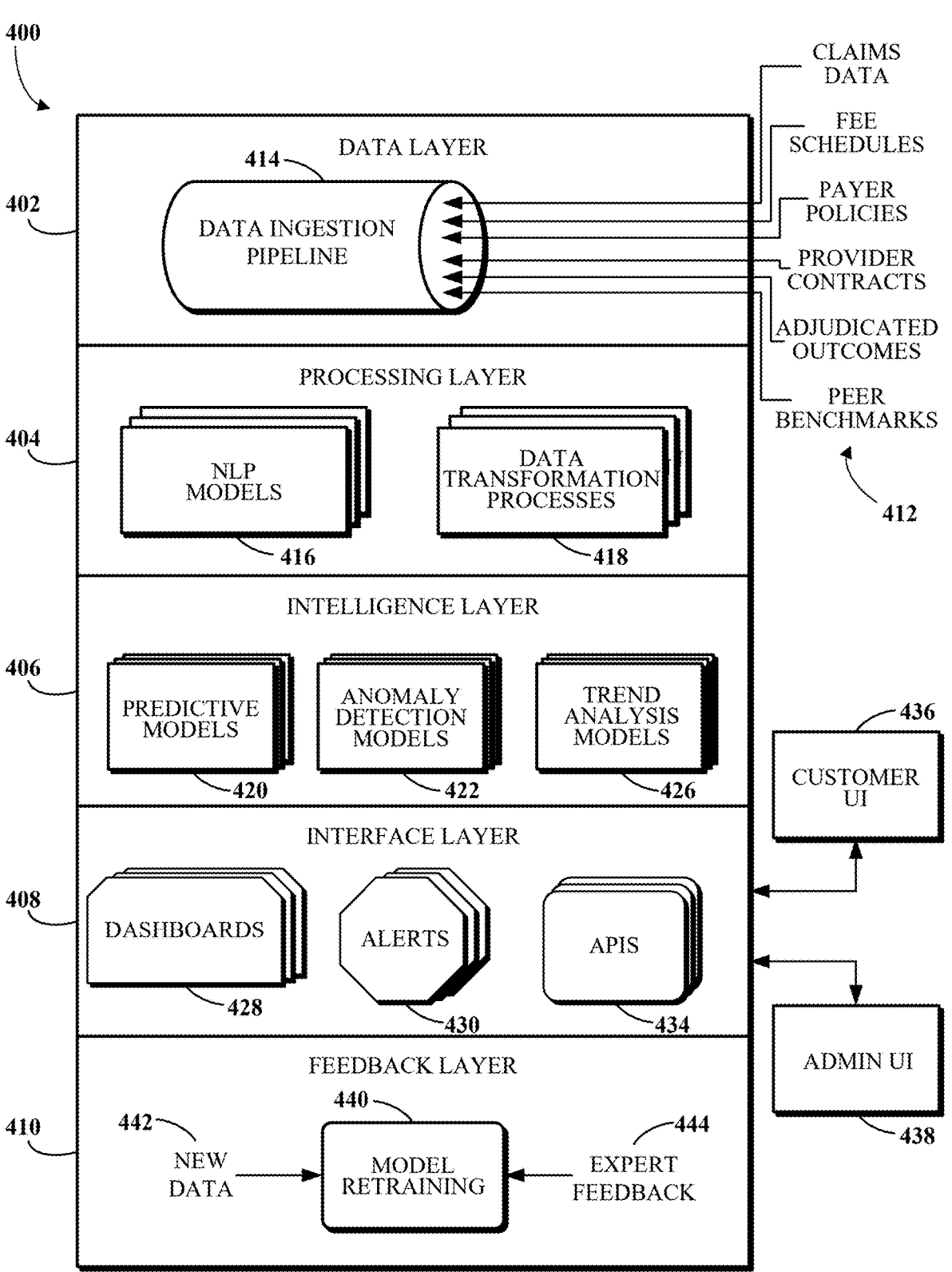
FIG. 4 is a block schematic diagram of an example associated with processing data to provide intelligent informational services.

FIG. 4 illustrates a block schematic diagram of an example associated with processing data to provide intelligent informational services according to aspects of the present disclosure. As shown, the example includes an AI system 400. The AI system 400 may be, be similar to, include, or be included in, the AI system 100 shown in FIG. 1A. The AI system 400 includes multiple functional layers including a data layer 402, a processing layer 404, an intelligence layer 406, an interface layer 408, and a feedback layer 410.

The data layer 402 may serve as the foundation of the AI system 400, receiving input data 412 through a data ingestion pipeline 414. The input data 412 may include a wide variety of healthcare revenue cycle information such as claims data, fee schedules, payer policies, provider contracts, adjudicated outcomes, and peer benchmarks. In some implementations, the input data 412 may also encompass patient demographic information, clinical data from EHRs, and historical billing patterns. In some implementations, the system may incorporate real-time data streams from connected medical devices or wearables to provide a more comprehensive view of patient health and associated billing implications.

The data ingestion pipeline 414 may be responsible for collecting, validating, and standardizing the diverse input data 412. This pipeline may employ various data integration techniques, including API connections, SFTP file transfers, and database replication, to ensure a continuous flow of up-to-date information. In some implementations, the data ingestion pipeline 414 may incorporate blockchain technology to enhance data integrity and traceability, particularly for sensitive healthcare information.

The processing layer 404 may include advanced data profiling capabilities to analyze and understand the structure, content, and quality of incoming data from various sources. Data profiling techniques may involve statistical analysis, pattern recognition, and metadata extraction to identify data types, formats, relationships, and anomalies within the input data 412. In some implementations, the system may employ machine learning algorithms to automate the data profiling process, enabling the discovery of complex data patterns and interdependencies that may not be apparent through manual inspection.

In some implementations, the data layer 402 and/or the processing layer 404 may be configured to perform a data profiling operation. In some implementations, the data profiling operation may involve using an ML-based data profiling tool to analyze first data associated with a first data source and generate first data profile content based on the first data. The first data profile content may identify first data schema content associated with the first data. In some implementations, the ML-based data profiling tool may be used to analyze second data associated with a second data source and generate second data profile content, which may identify second data schema content associated with the second data. In some aspects, the first and second data profile content may further identify data type information associated with their respective data sources. The data profiling operation may employ various data analysis techniques, such as statistical analysis, pattern recognition, and metadata extraction, to identify data types, formats, relationships, and anomalies within the input data.

Schema matching techniques may be performed by the processing layer 404 to align and map data elements from disparate sources to a unified schema. This process may involve identifying semantic and structural similarities between different data schemas, such as matching column names, data types, and value ranges. In some implementations, the system may use NLP algorithms to interpret and match schema elements based on their descriptions or associated metadata. The schema matching process may be iterative, with the system learning and improving its matching accuracy over time based on user feedback and observed data patterns.

Data standardization and cleaning operations may be performed to ensure consistency and accuracy across the unified dataset. These processes may include tasks such as normalizing data formats, resolving inconsistencies in naming conventions, and harmonizing units of measurement. In some implementations, the system may apply domain-specific rules and transformations, such as standardizing medical codes (e.g., converting between ICD-9 and ICD-10) or normalizing provider identifiers across different systems. Machine learning models may be employed to detect and correct data quality issues, such as identifying and imputing missing values or flagging potential data entry errors.

In some implementations, a data integration process that may be performed at least partially within the processing layer 404 may involve combining and reconciling data from multiple sources into a coherent and unified view. This may include resolving conflicts between overlapping data elements, merging duplicate records, and establishing relationships between entities across different datasets. In some implementations, the system may implement probabilistic matching algorithms to link patient records or claims data across disparate systems, even in the absence of perfect identifier matches.

Advanced entity resolution techniques may be applied as part of the data integration process to identify and link related entities across different data sources. This may involve using fuzzy matching algorithms, phonetic encoding, and machine learning-based similarity measures to reconcile variations in entity names, addresses, or other identifying information. In some implementations, the system may maintain a master data management (MDM) component to ensure consistent representation of key entities such as patients, providers, and payers across the integrated dataset.

The processing layer 404 may incorporate data lineage tracking capabilities to maintain transparency and auditability throughout the data integration process. This may involve recording the origin, transformations, and dependencies of each data element as it moves through the system. In some implementations, the data lineage information may be used to support data governance initiatives, facilitate troubleshooting of data issues, and enable the system to automatically update or reprocess affected data elements when source data changes.

Temporal aspects of data integration may be addressed within the processing layer 404 to handle time-sensitive information and historical data effectively. This may include strategies for managing data with different update frequencies, reconciling timestamp discrepancies across systems, and maintaining historical snapshots for trend analysis. In some implementations, the system may employ temporal databases or time series data structures to efficiently store and query time-varying data, such as changes in patient insurance coverage or evolving payer policies.

The data integration capabilities of the processing layer 404 may extend to handling semi-structured and unstructured data sources, such as clinical notes, medical images, or PDF documents. In these cases, the system may employ techniques such as optical character recognition (OCR), NLP, or computer vision algorithms to extract relevant information and integrate it with structured data sources. This comprehensive approach to data integration may enable the AI system 400 to leverage a wide range of information sources, providing a more holistic view of the healthcare revenue cycle and supporting more sophisticated analytics and decision-making processes.

The processing layer 404 contains NLP models 416 and data transformation processes 418 that process the ingested data. The NLP models 416 may be designed to extract meaningful information from unstructured text data, such as clinical notes, denial reasons, or payer correspondence. These models may utilize techniques like named entity recognition, sentiment analysis, and topic modeling to convert free-text information into structured, analyzable data. In some implementations, the NLP models 416 may be fine-tuned on domain-specific healthcare vocabularies to improve accuracy in medical terminology extraction.

Data transformation processes 418 in the processing layer 404 may be responsible for cleaning, normalizing, and enriching the data. These processes may include tasks such as standardizing medical codes (e.g., converting between ICD-9 and ICD-10), resolving data inconsistencies, and imputing missing values. In some implementations, the system may incorporate advanced data quality algorithms that use machine learning to detect and correct anomalies in the data automatically. For example, the system may employ a combination of rule-based and statistical approaches to identify and rectify coding errors, such as mismatched procedure and diagnosis codes or invalid modifier combinations. In some implementations, the data transformation processes may utilize natural language processing techniques to extract structured information from unstructured clinical notes, enhancing the richness of the available data for analysis.

The data transformation process within the processing layer 404 may involve a multi-stage approach to convert raw input data into a standardized, analyzable format. In some implementations, the system may employ a combination of rule-based transformations and machine learning algorithms to handle the diverse range of data types and formats encountered in healthcare revenue cycle management. The transformation process may begin with data parsing, where incoming data is broken down into its constituent elements based on predefined schemas or learned patterns. This parsing step may be particularly important for handling complex data structures such as ANSI X12 EDI files, which contain multiple nested segments and loops.

Following the parsing stage, the system may apply a series of data cleansing operations to address quality issues and inconsistencies. These operations may include removing duplicate records, standardizing date formats, correcting spelling errors in free-text fields, and resolving conflicting information across different data sources. In some implementations, the system may utilize fuzzy matching algorithms to identify and merge records that likely refer to the same entity but contain slight variations in identifying information. For example, the system may determine that "John Doe" and "Jon Doe" with matching dates of birth and addresses are likely the same patient, and consolidate their records accordingly.

The data transformation process may also involve semantic enrichment, where additional context and meaning are added to the raw data. This may include mapping local codes to standardized terminologies (e.g., converting proprietary service codes to CPT codes), inferring missing information based on available data (e.g., deriving a patient's age from their date of birth), and linking related data elements across different sources (e.g., associating a claim with relevant clinical documentation). In some implementations, the system may leverage external knowledge bases or ontologies to enhance the semantic richness of the transformed data, enabling more sophisticated analytics and decision support capabilities.

The intelligence layer 406 forms the analytical core of the AI system 400, comprising predictive models 420, anomaly detection models 422, and trend analysis models 426. Predictive models 420 may be designed to forecast various aspects of the revenue cycle, such as the likelihood of claim denials, expected reimbursement amounts, or patient payment behavior. These models may employ a range of machine learning techniques, including logistic regression, random forests, or gradient boosting machines, depending on the specific prediction task.

The predictive models 420 may incorporate a variety of machine learning algorithms and techniques to forecast different aspects of the healthcare revenue cycle. In some implementations, the system may utilize ensemble methods, combining multiple models to improve overall prediction accuracy and robustness. For example, a random forest classifier may be used in conjunction with a gradient boosting machine to predict the likelihood of claim denials, leveraging the strengths of both algorithms to capture complex patterns in the data.

The predictive models 420 may be trained on historical claims data, including features such as patient demographics, diagnosis codes, procedure codes, provider information, and payer details. In some implementations, the system may employ transfer learning techniques to adapt pre-trained models to specific healthcare organizations or specialties, allowing for faster model deployment and improved performance on smaller datasets. The models may also incorporate temporal features, such as seasonality and trends in claim adjudication patterns, to capture time-dependent variations in the revenue cycle.

In some implementations, the predictive models 420 may utilize deep learning architectures, such as recurrent neural networks (RNNs) or transformer models, to analyze sequential data in the claims processing workflow. These models may be particularly effective in capturing long-term dependencies and complex interactions between different stages of the revenue cycle. For example, an RNN-based model may be used to predict the expected time to payment for a claim, taking into account the entire history of interactions between the healthcare provider and the payer.

The system may also employ interpretable machine learning techniques to provide insights into the factors driving the predictions. In some implementations, the predictive models 420 may generate feature importance scores or use techniques like SHAP (SHapley Additive exPlanations) values to explain which input variables have the most significant impact on the predicted outcomes. This interpretability may enable healthcare providers to understand the underlying reasons for predicted claim denials or reimbursement amounts, facilitating targeted interventions and process improvements in their revenue cycle management.

Anomaly detection models 422 in the intelligence layer 406 may be useful for identifying unusual patterns or outliers in the revenue cycle data. These models may use techniques such as isolation forests, autoencoders, or clustering algorithms to flag potential issues like fraudulent claims, coding errors, or sudden changes in payer behavior. In some implementations, the anomaly detection models 422 may incorporate time series analysis to detect temporal anomalies, such as unexpected spikes in denial rates or changes in payment patterns over time.

The anomaly detection models 422 in the intelligence layer 406 may employ a combination of supervised and unsupervised machine learning techniques to identify unusual patterns or outliers in the healthcare revenue cycle data. These models may analyze various features of claims data, including but not limited to claim amounts, diagnosis codes, procedure codes, provider information, and payer behavior. In some implementations, the system may utilize isolation forests, which work by isolating anomalies in the feature space based on the principle that anomalies are rare and different. This approach may be particularly effective in detecting fraudulent claims or unusual billing patterns that deviate significantly from the norm.

In addition to isolation forests, the anomaly detection models 422 may incorporate autoencoder neural networks to identify anomalies in high-dimensional data. Autoencoders may be trained on normal revenue cycle data to learn a compressed representation of the input features. When presented with new data, the autoencoder may attempt to reconstruct the input from its compressed representation. Data points that result in high reconstruction errors may be flagged as potential anomalies. This technique may be useful for detecting subtle deviations in claim characteristics or payer behavior that might not be apparent through traditional rule-based approaches. Furthermore, the system may employ time series analysis techniques, such as ARIMA models or Prophet, to detect temporal anomalies in the revenue cycle data. These models may help identify unexpected spikes in denial rates, sudden changes in payment patterns, or shifts in payer adjudication practices over time.

Trend analysis models 426 may be responsible for uncovering long-term patterns and relationships in the revenue cycle data. These models may employ techniques like time series decomposition, seasonal trend analysis, or causal inference methods to identify underlying factors affecting financial performance. In some implementations, the system may incorporate advanced forecasting techniques like Prophet or ARIMA models to provide more accurate long-term revenue projections.

The interface layer 408 may serve as the bridge between the AI system's analytical capabilities and its users, providing multiple output interfaces including dashboards 428, alerts 430, and APIs 434. Dashboards 428 may offer visual representations of key performance indicators, trends, and insights derived from the intelligence layer. These dashboards may be interactive, allowing users to drill down into specific data points or customize views based on their roles and preferences. In some implementations, the dashboards 428 may incorporate augmented reality (AR) features for immersive data exploration experiences.

Alerts 430 in the interface layer 408 may provide timely notifications of important events, anomalies, or actionable insights detected by the AI system. These alerts may be delivered through various channels such as email, SMS, or in-app notifications, and can be customized based on user roles and preferences. In some implementations, the system may include a smart alerting system that uses machine learning to prioritize and contextualize alerts, reducing alert fatigue and ensuring that users receive the most relevant information.

The AI system may organize metrics into a hierarchical structure to facilitate efficient analysis and alert generation. At the core of this structure are individual metrics, which represent specific measurable aspects of the healthcare revenue cycle. These metrics may include various types such as denial rates, claims submission volumes, accounts receivable aging, or reimbursement rates. Each metric may be associated with a particular time frame and aggregation method, forming what may be referred to as a metric subtype. For example, a "14-day rolling average denial rate" or a "60-day standard deviation of rolling rate" may constitute different subtypes of the denial rate metric.

Metrics may be grouped into metric groups, which represent collections of related metrics that provide a comprehensive view of a particular aspect of the revenue cycle. For instance, a denial-related metric group may include metrics such as overall denial rate, denial rate by reason code, and average time to resolve denials. The system may allow for flexible definition of metric groups, enabling healthcare organizations to tailor their analytics to specific operational needs or strategic priorities. Furthermore, the AI system may implement a segmentation approach to provide granular insights into metric performance across different dimensions of the healthcare business. Segments may include categories such as payer, facility, medical group, or rendering provider group. By applying these segments to metrics and metric groups, the system may generate multidimensional analyses that allow users to drill down into specific areas of concern or identify patterns across different operational units.

The AI system may structure data to support alerts through a comprehensive and flexible data model. This model may include several key components designed to capture, organize, and facilitate the generation and management of alerts within the healthcare revenue cycle management context. At the core of the alert data structure may be an Alert table. This table may contain essential information about each alert, including a unique identifier, alert type, alert date, alert name, status, and description. The alert type field may categorize alerts into different classes, such as denials, accounts receivable, or revenue-related issues. The alert date may represent the business-relevant date for the alert, which could differ from the system's creation timestamp.

The Alert table may be associated with a MetricGroup table through a foreign key relationship. Each alert may be linked to a specific metric group, which represents a set of related metrics used to generate the alert. The MetricGroup table may store information about the type of metrics it contains, such as AR (accounts receivable) or denials, and may include a JSON structure that defines the set of segments used to filter and group the metrics. To support flexible segmentation of metrics and alerts, the system may implement a MetricSegment table. This table may define the specific dimensions or filters applied to a metric group, such as payer, facility, medical group, or rendering provider group. Each metric segment may have an order field, allowing for prioritization of segments within a metric group. This structure may enable the system to generate alerts based on multi-dimensional analysis of the revenue cycle data.

The system may utilize separate metric tables for different types of financial data. For example, there may be Metric_AR_Bin and Metric_AR_Agg tables for storing accounts receivable metrics at different levels of granularity. These tables may contain fields for specific AR-related measurements, such as AR amounts for different time bins (0-30 days, 31-60 days, etc.) or aggregated AR totals. Similar tables may exist for other metric types, such as denials or remittances.

To maintain a historical record of metrics and support trend analysis for alerts, the system may implement a MetricLog table. This table may store all versions of metrics over time, allowing the system to track changes and generate alerts based on historical comparisons. A corresponding MetricCurrent table may maintain the latest version of each metric, enabling efficient querying for the most up-to-date information when generating alerts. The alert data structure may include an AlertMetric table to establish the relationship between alerts and the specific metrics that triggered them. This table may serve as a bridge, linking each alert to one or more metrics from the MetricLog or MetricCurrent tables. This structure may allow the system to provide detailed context and supporting data for each generated alert.

To support user interaction and feedback on alerts, the system may implement an AlertUser table. This table may store information about user interactions with alerts, such as whether an alert has been viewed, acknowledged, or acted upon. It may also capture user feedback, such as the perceived relevance or usefulness of the alert, which can be used to improve future alert generation and prioritization. The data model may include an AlertGroup table to support the grouping of related alerts. This feature may be particularly useful for tracking the progression of issues over time or for consolidating multiple alerts related to a single root cause. The AlertGroup table may have a many-to-many relationship with the Alert table, allowing for flexible grouping of alerts based on various criteria.

To enhance the context and actionability of alerts, the system may implement an AlertAction table. This table may store recommended actions or next steps associated with each alert type. By linking alerts to specific actions, the system may provide users with guidance on how to address the issues identified by the alerts, improving the overall efficiency of the revenue cycle management process. The alert data structure may also include support for alert prioritization through an AlertPriority table. This table may define different priority levels and their associated characteristics, such as response time requirements or escalation procedures. By assigning priorities to alerts, the system may help users focus on the most critical issues affecting the revenue cycle.

To facilitate the customization of alert delivery and presentation, the system may implement an AlertProfile table. This table may store user-specific or role-specific preferences for alert notifications, such as delivery channels, frequency, and visualization options. By tailoring the alert experience to individual users or roles, the system may improve the relevance and effectiveness of the alerting mechanism.

In some implementations, the AI system may utilize a single, comprehensive Metric table to capture all the information described in the previous data model. This unified Metric table may incorporate fields to represent various types of metrics, including accounts receivable, denials, remittances, and other financial indicators. The table may include columns for metric type, metric subtype, metric value, metric date, and aggregation method, allowing for flexible storage of different metric categories and subtypes within a single structure.

To support the hierarchical organization and segmentation of metrics, the Metric table may include additional columns for metric group, segment type, and segment value. These fields may allow for the representation of metric groups and multi-dimensional segmentation without the need for separate MetricGroup and MetricSegment tables. The table may also incorporate a version column and a timestamp to maintain historical records and support trend analysis, effectively combining the functionality of the previously described MetricLog and MetricCurrent tables. This approach may simplify data retrieval and reduce the need for complex joins when generating alerts or populating dashboards, potentially improving query performance and system scalability.

APIs 434 may enable seamless integration of the AI system's capabilities with other healthcare IT systems, such as electronic health records (EHRs), practice management software, or third-party analytics tools. These APIs may support both data ingestion and output, allowing for bidirectional information flow. In some implementations, the APIs 434 may incorporate GraphQL for more flexible and efficient data querying, or implement OAuth 2.0 for enhanced security in data exchange.

The interface layer 408 connects to both a customer UI 436 and an administrator UI 438, catering to different user roles within the healthcare organization. The customer UI 436 may be designed for end-users such as billing specialists, revenue cycle managers, or financial analysts, providing intuitive access to insights and functionalities relevant to their daily operations. The administrator UI 438, on the other hand, may offer more advanced configuration options, system monitoring tools, and access to detailed performance metrics.

The AI system 400 may continually learn and improve through the feedback layer 410. This layer contains a model retraining component 440 configured to train and/or retrain one or more ML models. In some implementations, the model retraining component 440 may implement one or more aspects of ML training described above in connection with FIG. 3. The model retraining component 440 may receive new data 442 and expert feedback 444. The new data 442 may include the latest claims data, updated payer policies, or recent adjudication outcomes, allowing the system to adapt to changing patterns in the healthcare landscape. Expert feedback 444 may come from healthcare professionals, billing specialists, or domain experts who can provide valuable insights or corrections to the system's outputs.

The model retraining component 440 may use this input to update and refine the various models in the intelligence layer 406. This may involve techniques such as online learning, transfer learning, or periodic batch retraining to incorporate new information without compromising the stability of existing models. In some implementations, the model retraining component 440 may employ automated machine learning (AutoIL) techniques to continuously optimize model architectures and hyperparameters based on performance metrics and new data.

Figure 5:
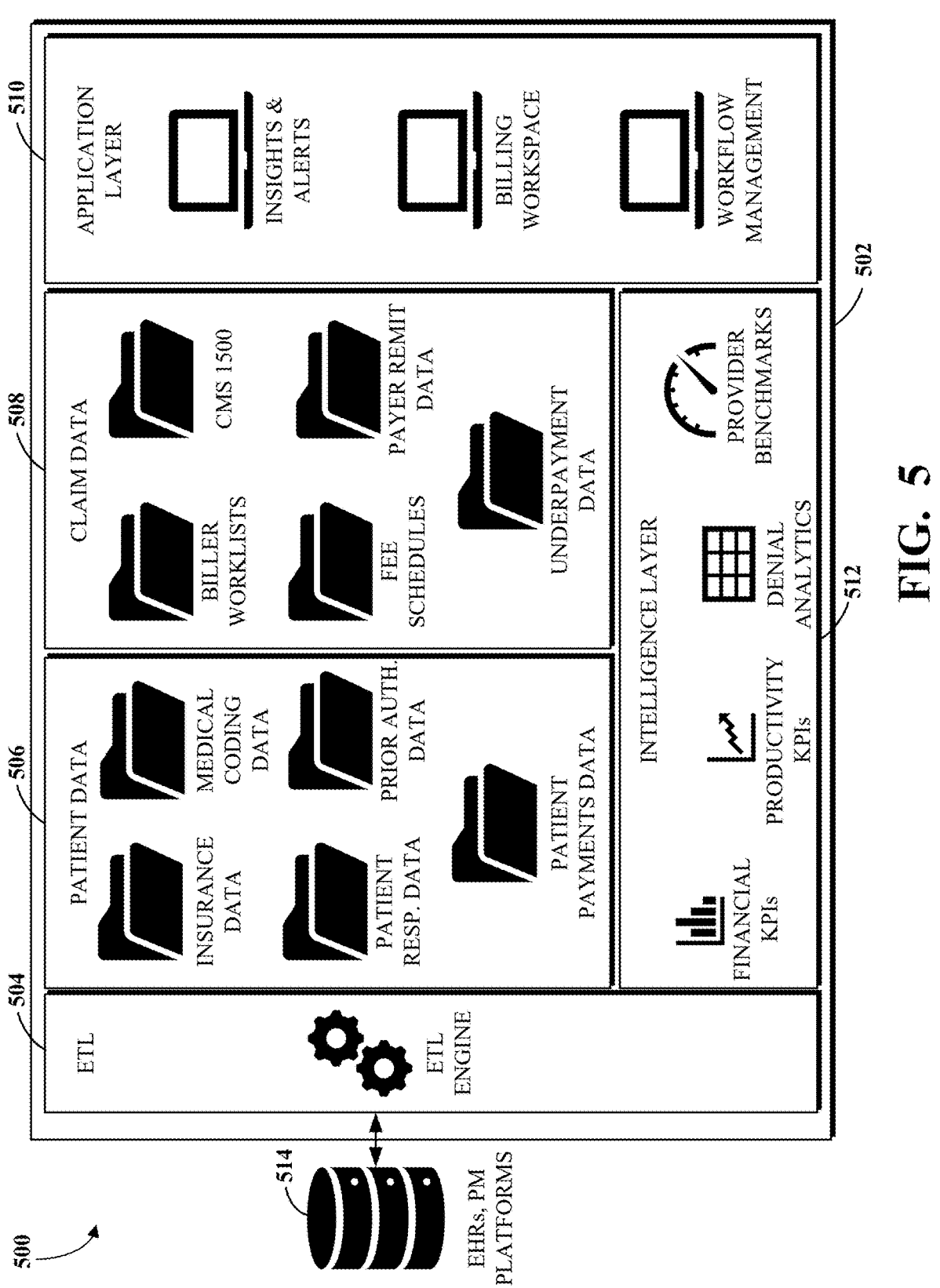
FIG. 5 is a block diagram of another example of an artificial intelligence system for providing intelligent informational services associated with healthcare workflows.

FIG. 5 illustrates a block diagram of an example of an AI system 500 for providing intelligent informational services associated with healthcare workflows according to aspects of the present disclosure. The AI system 500 comprises multiple interconnected components designed to process, analyze, and optimize healthcare revenue cycle management data. The AI system 500 may be, be similar to, include, or be included in, the AI system 100 shown in FIG. 1A.

The AI system 500 includes an application interface 502 that serves as the primary point of interaction for users of the system. This interface may be implemented as a web-based portal, a mobile application, or a desktop client, providing access to various features and functionalities of the AI system 500. For example, the application interface 502 may offer customizable dashboards for different user roles, such as billing specialists, revenue cycle managers, or financial analysts. In some implementations, the application interface 502 may incorporate voice-activated controls or augmented reality displays for hands-free operation in clinical settings.

A data processing engine 504 forms a component of the AI system 500, responsible for ingesting, cleaning, and transforming raw data from various sources. This engine may employ advanced ETL (Extract, Transform, Load) processes, utilizing machine learning algorithms to automate data cleansing and normalization tasks. For instance, the data processing engine 504 may use natural language processing techniques to extract relevant information from unstructured clinical notes or payer correspondence. In some implementations, the data processing engine 504 may incorporate blockchain technology to ensure data integrity and traceability throughout the revenue cycle management process.

The AI system 500 includes a patient data repository 506 that stores comprehensive information related to patient care and billing. This repository may contain various types of data, including medical coding information, insurance details, prior authorization records, patient response data, and patient payment history. For example, the medical coding data might include ICD-10 diagnosis codes, CPT procedure codes, and HCPCS codes for medical supplies and equipment. In some implementations, the patient data repository 506 may utilize advanced data compression techniques or implement a data lake architecture to efficiently store and manage large volumes of diverse patient information.

A claim data repository 508 within the AI system 500 is dedicated to storing and managing claim-related information. This repository may include data types such as CMS 1500 form data, biller worklists, fee schedules, payer remit data, and underpayment information. For instance, the CMS 1500 data might encompass details like patient demographics, insurance information, diagnoses, and procedures performed. In some implementations, the claim data repository 508 may employ a graph database structure to efficiently represent and query complex relationships between claims, patients, providers, and payers.

The AI system 500 features an application layer 510 that houses key functional components for revenue cycle management. This layer may include modules for insights and alerts, billing workspace, and workflow management. For example, the insights and alerts component may use machine learning algorithms to detect unusual patterns in claim denials or identify potential coding errors before submission. The billing workspace might offer an intuitive interface for managing claims throughout their lifecycle, while the workflow management component may optimize task allocation among billing staff. In some implementations, the application layer 510 may incorporate robotic process automation (RPA) capabilities to automate repetitive tasks within the revenue cycle workflow.

An intelligence layer 512 within the AI system 500 provides advanced analytical capabilities to support decision-making and process optimization. This layer may offer functionalities such as financial KPIs, productivity KPIs, denial analytics, and provider benchmarks. For instance, the financial KPIs might include metrics like days in accounts receivable, clean claim rate, or collection rate, while productivity KPIs may track metrics such as claims processed per hour or denial resolution time. In some implementations, the intelligence layer 512 may utilize reinforcement learning techniques to continuously optimize revenue cycle strategies based on observed outcomes and financial impact.

The AI system 500 interacts with various data sources 514, which may include EHR systems, practice management software, clearinghouse services, payer portals, and financial management systems. These data sources provide the raw input that fuels the AI system's analytical capabilities. For example, an EHR system might supply clinical documentation and charge capture data, while a clearinghouse service may provide claim submission and response information. In some implementations, the AI system 500 may incorporate edge computing nodes to process and analyze data from internet-of-things (IoT) medical devices or wearables, providing real-time insights into patient health and potential billing implications.

The components of the AI system 500 are interconnected through an application interface 502, which facilitates seamless data flow and communication between different modules. This interface may utilize standardized healthcare data exchange protocols, such as HL7 FHIR or X12 EDI, to ensure interoperability with external systems. In some implementations, the application interface 502 may employ a microservices architecture, allowing for greater flexibility and scalability in deploying and updating individual components of the AI system 500. Some aspects might incorporate an event-driven architecture to enable real-time responsiveness to changes in the healthcare revenue cycle landscape.

Figure 6:
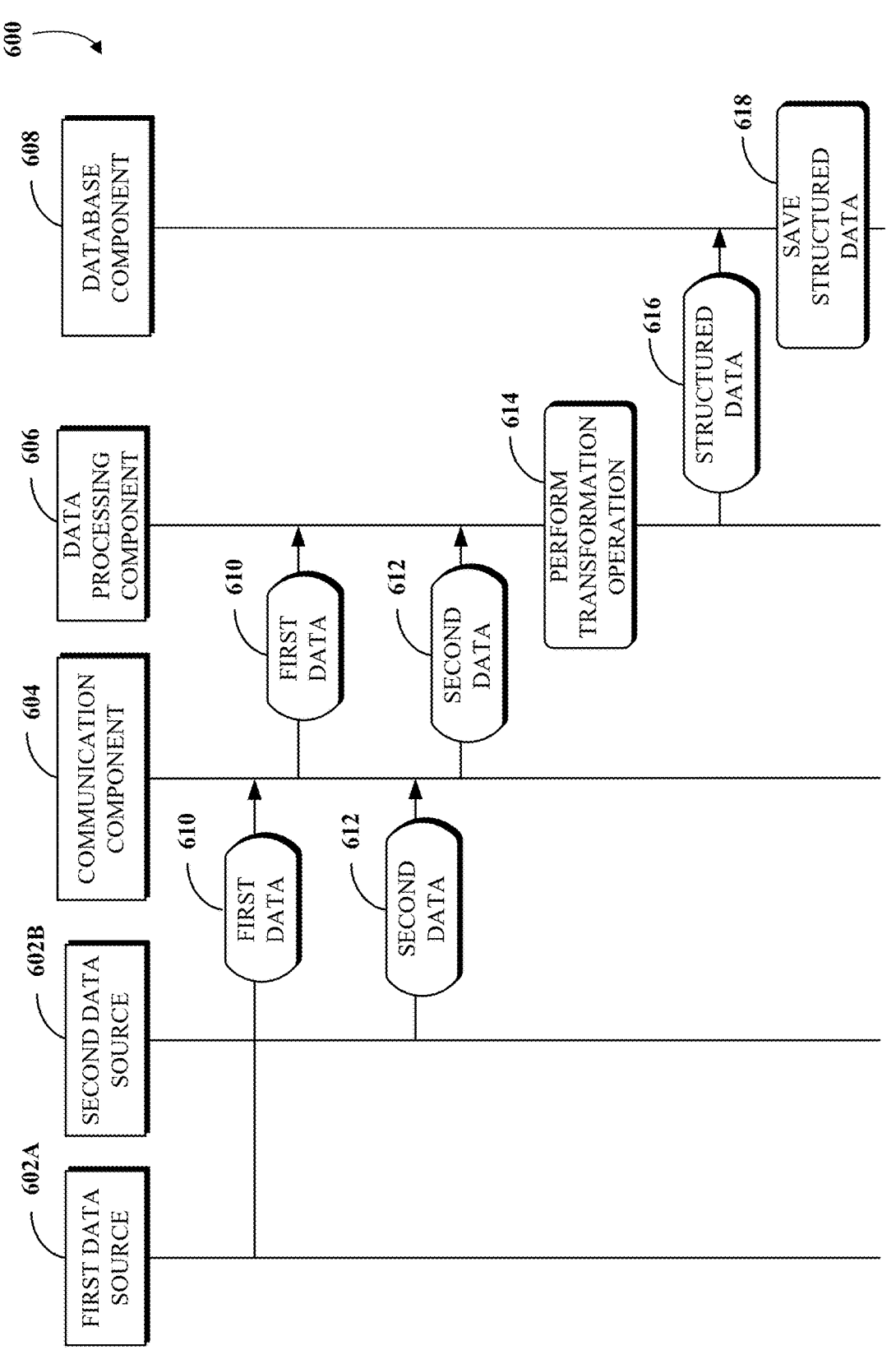
FIG. 6 is a flow diagram associated with processing data from disparate data sources.

FIG. 6 illustrates a flow diagram of an example of a process 600 for processing data from disparate data sources according to aspects of the present disclosure. The process 600 depicts the flow of data through various components of an AI system for healthcare revenue cycle management.

The process 600 begins with data ingestion from a first data source 602A and a second data source 602B. These data sources may represent different systems commonly used in healthcare organizations, such as EHR systems, practice management software, clearinghouse services, payer portals, or financial management systems. For example, the first data source 602A could be an Epic EHR system containing clinical documentation and charge capture data, while the second data source 602B might be a Waystar clearinghouse service providing claim submission and response information. In some implementations, the process 600 may incorporate additional data sources, such as real-time patient monitoring devices or wearable health trackers, to provide a more comprehensive view of patient health and potential billing implications.

A communication component 604 receives and manages the data flow from these sources. This component may employ various data integration techniques to ensure efficient and secure data transfer. For instance, the communication component 604 might utilize HL7 FHIR (Fast Healthcare Interoperability Resources) standards for exchanging healthcare information electronically, or implement X12 EDI (Electronic Data Interchange) protocols for standardized business communication. In some implementations, the communication component 604 may incorporate blockchain technology to enhance data integrity and traceability throughout the revenue cycle management process.

The data processing component 606 is responsible for processing first data 610 from the first data source 602A and second data 612 from the second data source 602B. This component may employ advanced ETL (Extract, Transform, Load) processes, utilizing machine learning algorithms to automate data cleansing and normalization tasks. For example, the data processing component 606 might use natural language processing techniques to extract relevant information from unstructured clinical notes or payer correspondence. In some implementations, the data processing component 606 could incorporate edge computing capabilities to process and analyze data from IoT medical devices in real-time, providing immediate insights into patient health and potential billing implications.

A function of the data processing component 606 is to perform a transformation operation 614 on the received data. This operation may involve various data integration and normalization techniques to convert disparate data formats into a unified structure. For instance, the transformation operation 614 might standardize medical codes (e.g., converting between ICD-9 and ICD-10), resolve inconsistencies in naming conventions, or harmonize units of measurement across different systems. In some implementations, the transformation operation 614 could employ advanced entity resolution techniques, using probabilistic matching algorithms to link patient records or claims data across disparate systems, even in the absence of perfect identifier matches.

The transformation operation 614 generates structured data 616, which represents the harmonized and normalized version of the input data. This structured data may include various types of information relevant to healthcare revenue cycle management, such as patient demographics, insurance details, diagnosis and procedure codes, claim statuses, and payment information. In some implementations, the structured data 616 could also incorporate derived features or calculated metrics that provide additional insights into revenue cycle performance, such as predicted likelihood of claim denials or estimated time to payment.

A database component 608 is responsible for storing the processed information. The structured data 616 is stored as structured data storage 618 within the database component 608. This storage may utilize advanced database technologies to efficiently manage large volumes of healthcare data. For example, the database component 608 might employ a combination of relational and NoSQL databases to accommodate the diverse types of data encountered in revenue cycle management. In some implementations, the database component 608 could incorporate a data lake architecture to store and analyze large volumes of unstructured and semi-structured data, providing greater flexibility for future analytics and machine learning applications.

The process 600 demonstrates an approach to data integration and transformation in healthcare revenue cycle management. By leveraging AI and machine learning techniques, the system can efficiently process and normalize data from multiple disparate sources, creating a unified data model that supports advanced analytics and decision-making. This approach may address the technical challenges of fragmented data in healthcare IT systems, enabling healthcare providers to gain a holistic view of their revenue cycle and identify opportunities for optimization.

In some implementations, the process 600 could be extended to incorporate real-time data streaming capabilities, allowing for immediate processing and analysis of incoming data. This could enable the system to provide near-instantaneous alerts and insights, such as flagging potential claim denials before submission or identifying sudden changes in payer behavior that might impact revenue. Additionally, the process could be enhanced with advanced data governance features, such as automated data quality checks, data lineage tracking, and compliance monitoring to ensure adherence to healthcare data privacy regulations like HIPAA.

Figure 7:
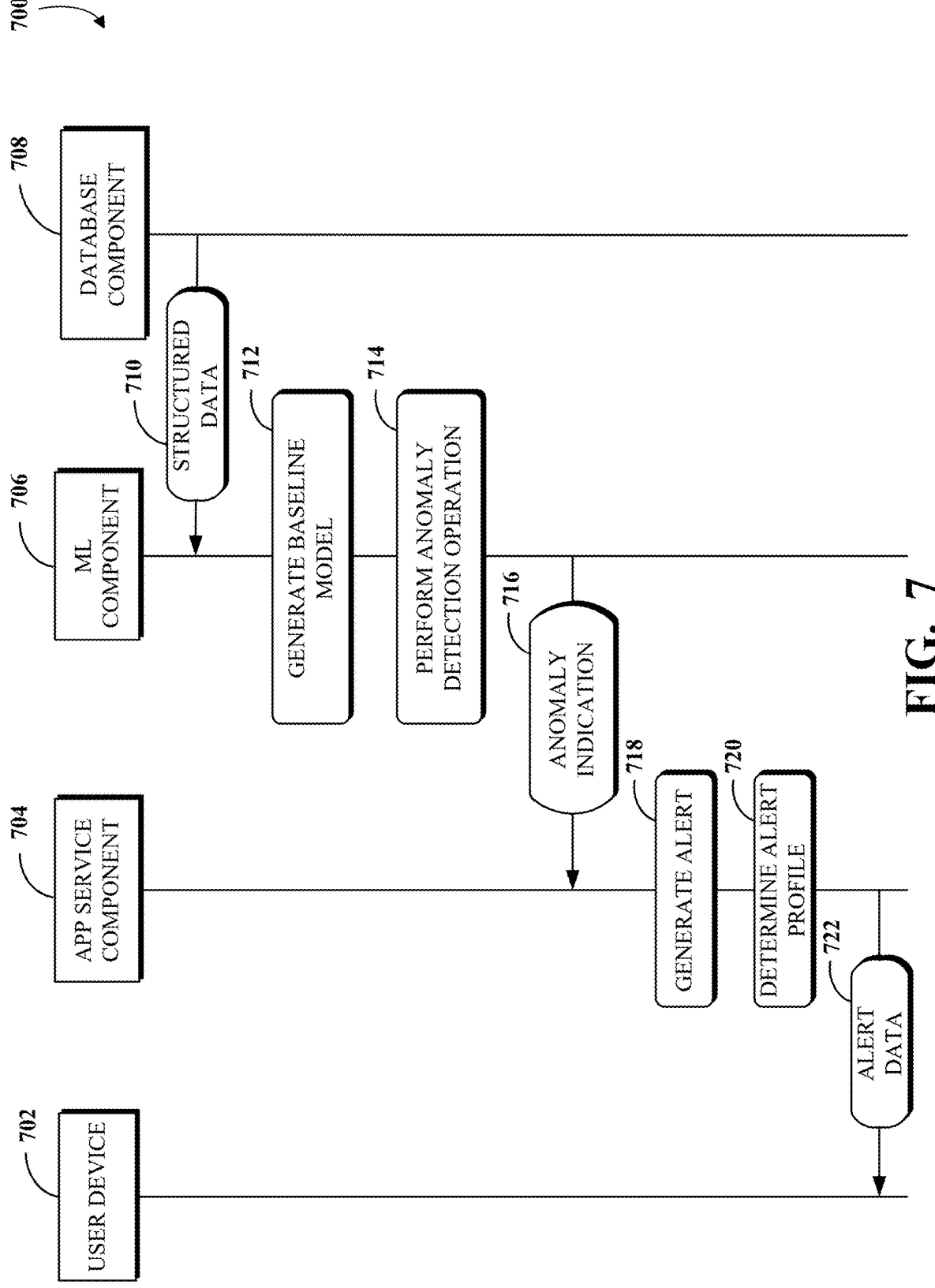
FIG. 7 is a flow diagram associated with providing alerts associated with healthcare workflows.

FIG. 7 illustrates a flow diagram of an example of a process 700 for providing alerts associated with healthcare workflows according to aspects of the present disclosure. The process 700 depicts the flow of data through various components of an AI system for healthcare revenue cycle management.

The process 700 begins with a user device 702, which may represent various endpoints through which users interact with the AI system. These devices may include desktop computers, laptops, tablets, smartphones, or specialized healthcare workstations. In some implementations, the user device 702 may be a wearable device or a voice-activated assistant, allowing for hands-free interaction in clinical settings. The user device 702 serves as both an input source for user interactions and the ultimate destination for alert data generated by the system.

An app service component 704 acts as an intermediary between the user device 702 and the core analytical components of the AI system. This component may manage user authentication, handle API requests, and coordinate the flow of information between different parts of the system. In some embodiments, the app service component 704 may implement a microservices architecture, allowing for greater flexibility and scalability in deploying and updating individual components of the AI system. Alternative implementations might incorporate an event-driven architecture to enable real-time responsiveness to changes in the healthcare revenue cycle landscape.

The ML component 706 represents the machine learning engine of the AI system. This component is responsible for analyzing data and generating insights using various machine learning models. In the context of healthcare revenue cycle management, the ML component 706 may employ a range of techniques, including supervised learning for predicting claim outcomes, unsupervised learning for anomaly detection, and reinforcement learning for optimizing billing workflows. In some implementations, the ML component 706 may utilize ensemble methods, combining multiple models to improve overall prediction accuracy and robustness.

A database component 708 serves as the data storage and retrieval system for the AI platform. This component may utilize advanced database technologies to efficiently manage large volumes of healthcare data. For example, the database component 708 might employ a combination of relational and NoSQL databases to accommodate the diverse types of data encountered in revenue cycle management. In some implementations, the database component 708 could incorporate a data lake architecture to store and analyze large volumes of unstructured and semi-structured data, providing greater flexibility for future analytics and machine learning applications.

The process 700 involves several key operations performed by the ML component 706. The first operation is to generate baseline model 712, which establishes a reference point for normal behavior in the healthcare revenue cycle data. This baseline model may be created using historical claims data, including features such as patient demographics, diagnosis codes, procedure codes, and claim outcomes. In some implementations, the system may employ transfer learning techniques to adapt pre-trained models to specific healthcare organizations or specialties, allowing for faster model deployment and improved performance on smaller datasets.

Following the baseline model generation, the ML component 706 performs an anomaly detection operation 714. This operation analyzes incoming data against the baseline model to identify unusual patterns or deviations that may indicate issues in the revenue cycle. The anomaly detection operation 714 may utilize various techniques such as isolation forests, autoencoders, or clustering algorithms to flag potential problems like fraudulent claims, coding errors, or sudden changes in payer behavior. In some implementations, the anomaly detection operation 714 may incorporate time series analysis to detect temporal anomalies, such as unexpected spikes in denial rates or changes in payment patterns over time.

When the anomaly detection operation 714 identifies a significant deviation from the baseline, it produces an anomaly indication 716. This indication serves as a trigger for the alert generation process. The anomaly indication 716 may include details about the nature of the anomaly, its severity, and the specific data points or trends that contributed to its detection. In some implementations, the system may employ explainable AI techniques to provide insights into why a particular anomaly was flagged, enhancing transparency and trust in the AI-driven alerting process.

Based on the anomaly indication 716, the process generates an alert 718. This step involves transforming the technical anomaly detection results into actionable information for end-users. The alert generation process may consider factors such as the type of anomaly, its potential financial impact, and historical patterns to determine the urgency and relevance of the alert. In some embodiments, the system may use natural language generation techniques to create human-readable alert descriptions that clearly communicate the issue and its implications.

The process then determines an alert profile 720, which tailors the alert presentation based on user-specific or role-specific preferences. This profiling step ensures that alerts are delivered in a manner most relevant and actionable for each user. For example, a billing specialist might receive detailed alerts about specific claims, while a financial executive might see higher-level alerts about overall revenue trends. In some implementations, the alert profile determination may incorporate machine learning to adapt to user behavior over time, improving the relevance and effectiveness of alerts based on how users interact with and respond to them.

Finally, the process generates alert data 722, which is the formatted information sent back to the user device 702 through the app service component 704. This alert data may include various elements such as the alert description, relevant metrics, suggested actions, and links to more detailed information. In some implementations, the alert data may be designed to support interactive visualizations or augmented reality displays, allowing users to explore the underlying data and context of the alert more intuitively.

The process 700 demonstrates a comprehensive approach to AI-driven alerting in healthcare revenue cycle management. By leveraging machine learning for baseline modeling, anomaly detection, and personalized alert generation, the system can provide timely and actionable insights to healthcare providers. This approach may address the technical challenges of identifying and responding to revenue cycle issues in a complex and dynamic healthcare environment, enabling providers to optimize their financial operations and reduce revenue leakage.

Figure 8:
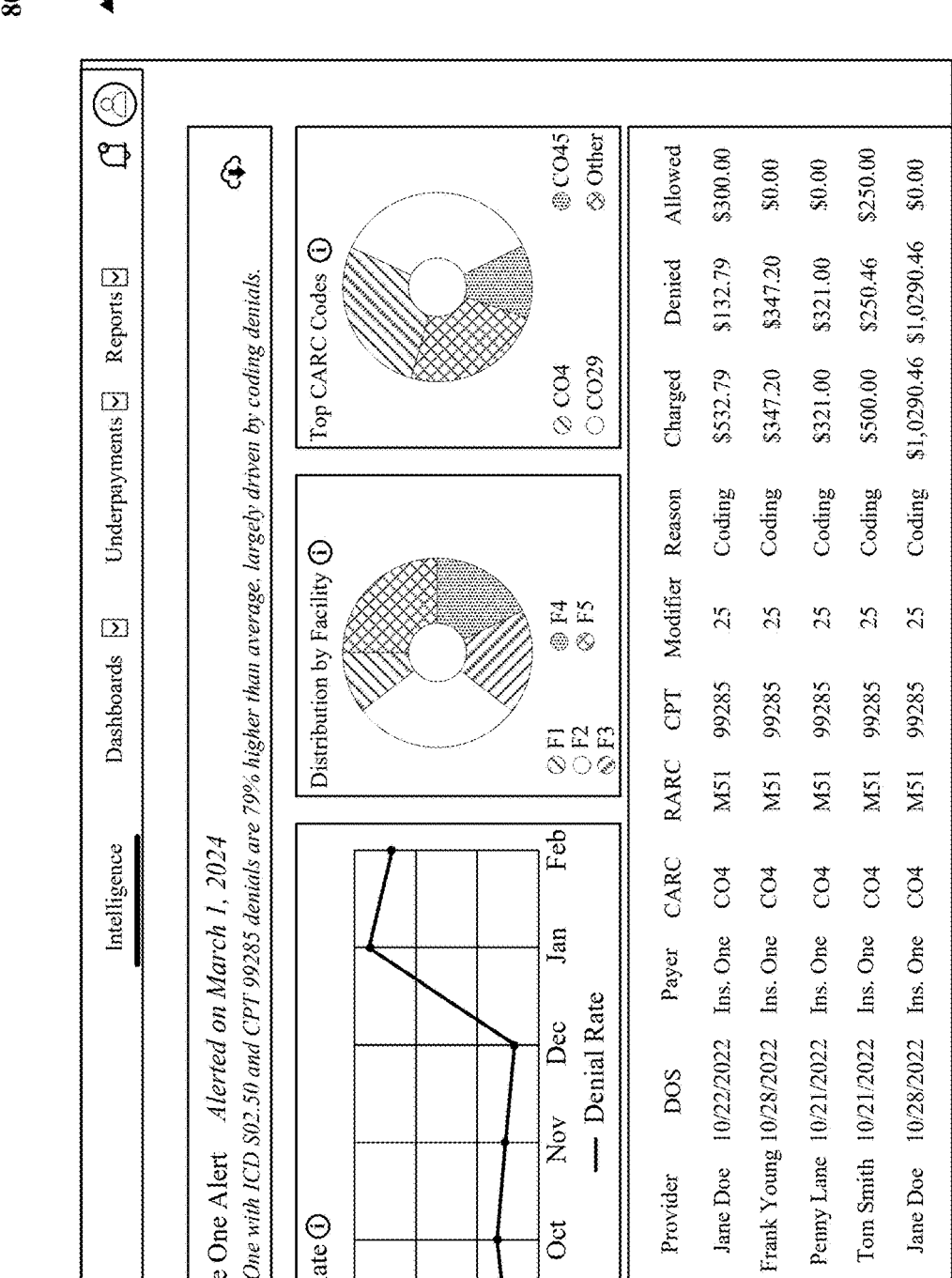
FIG. 8 is a diagram depicting an example of a graphical user interface associated with providing alerts associated with healthcare workflows.

FIG. 8 illustrates a graphical user interface (GUI) 800 for displaying healthcare insurance claim analytics according to aspects of the present disclosure. The GUI 800 presents multiple data visualization components arranged in a dashboard layout, providing users with a comprehensive view of revenue cycle management metrics and insights.

The interface includes a line graph showing denial rate trends over time, with months from September through February plotted on the x-axis and denial rate percentages from 0 to 60 on the y-axis. This visualization may allow users to quickly identify patterns or anomalies in claim denials over the specified time period. In some implementations, the line graph may be interactive, allowing users to hover over data points for more detailed information or select specific time ranges for further analysis.

Adjacent to the line graph are two pie charts—one showing distribution by facility and another displaying top CARC (Claim Adjustment Reason Code) codes. These charts may provide users with a quick overview of how denials are distributed across different healthcare facilities and the most common reasons for claim adjustments. In alternative embodiments, the GUI may offer options to switch between different chart types, such as bar charts or treemaps, to visualize this data in various formats based on user preferences.

The GUI 800 also contains a detailed data table with columns for claim ID, provider name, date of service (DOS), payer, CARC code, RARC (Remittance Advice Remark Code) code, CPT (Current Procedural Terminology) code, modifier, reason, and financial amounts including charged, denied, and allowed values. This table displays multiple claim records with associated information and monetary values, allowing users to drill down into specific claim details. In some implementations, the table may include sorting and filtering capabilities, enabling users to quickly locate and analyze specific subsets of claims based on various criteria.

The interface incorporates navigation elements and interactive components that allow users to access different views of the insurance claim data. These elements may include dropdown menus, tabs, or buttons that enable users to switch between different analytics dashboards or apply various filters to the displayed data. In alternative embodiments, the GUI may incorporate a search functionality that allows users to quickly locate specific claims or providers within the dataset.

The layout of GUI 800 organizes the information in a structured format that enables users to analyze denial rates, claim distributions, and detailed claim information within a single view. This consolidated presentation of data may help healthcare providers quickly identify trends, anomalies, or areas requiring attention in their revenue cycle management processes. In some implementations, the GUI may include customization options that allow users to rearrange or resize different components of the dashboard based on their specific needs or preferences.

The GUI 800 may also incorporate AI-driven insights and recommendations based on the analyzed data. For example, the interface may highlight specific claims or trends that the AI system has identified as requiring immediate attention, or provide suggestions for optimizing billing practices based on historical patterns. In alternative embodiments, the GUI may include a natural language interface that allows users to ask questions about their revenue cycle data and receive AI-generated responses and visualizations.

Figure 9:
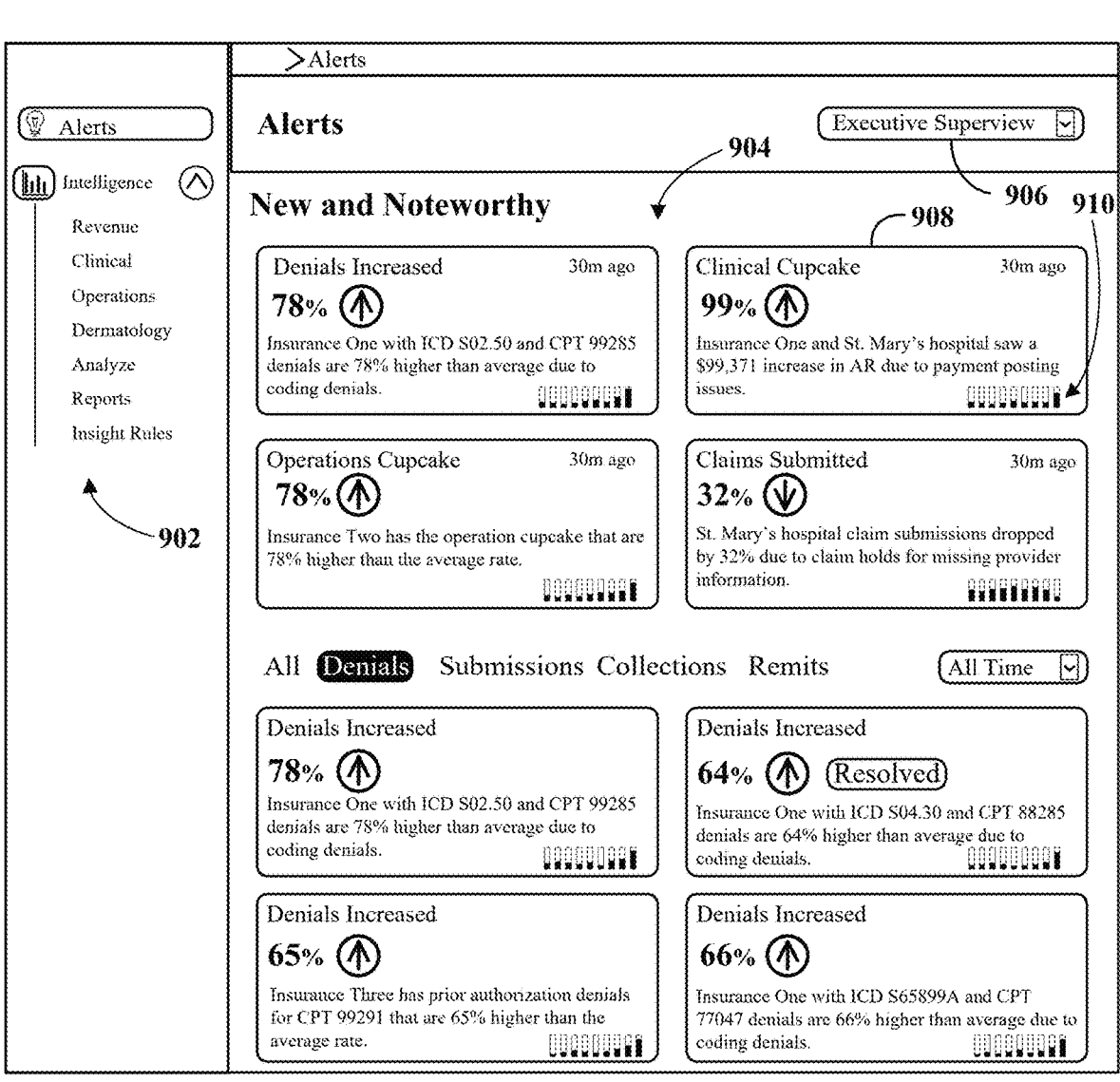
FIG. 9 is a diagram depicting another example of a graphical user interface associated with providing alerts associated with healthcare workflows.

FIG. 9 illustrates a graphical user interface (GUI) 900 for displaying alerts and analytics according to aspects of the present disclosure. The GUI 900 comprises multiple interconnected components designed to provide users with a comprehensive view of revenue cycle management metrics, insights, and alerts.

The GUI 900 includes a navigation menu 902 positioned on the left side of the interface. The navigation menu 902 contains options for accessing various sections of the application, including Alerts, Intelligence, Revenue, Clinical, Operations, Dermatology, Analyze, Reports, and Insight Rules. In some implementations, the navigation menu 902 may be collapsible to provide more screen space for data visualization. Some embodiments may include additional menu items or allow for customization of the menu based on user preferences or role-specific access rights.

The main content area of the GUI 900 features an alert section 904 titled "Alerts" with a "New and Noteworthy" subsection. This alert section 904 may serve as a central hub for displaying important information and anomalies detected by the AI system. The alerts presented in this section may be generated based on various factors, such as unusual claim denial patterns, unexpected changes in revenue, or potential compliance issues. In some implementations, the alert section 904 may include additional categorization options or allow users to customize the types of alerts displayed based on their specific areas of responsibility.

A view selector 906 is positioned in the upper right corner of the GUI 900, allowing users to switch between different views of the data. The current selection shown is "Executive Superview," which may provide a high-level overview of key performance indicators and important alerts. Other view options might include detailed operational views, financial summaries, or specialty-specific dashboards. In some embodiments, the view selector 906 may incorporate machine learning algorithms to suggest the most relevant view based on the user's role, historical usage patterns, or current system status.

The alert section 904 displays multiple alert cards 908, each presenting various metrics and notifications related to healthcare revenue cycle management. These alert cards 908 may be designed to provide quick, at-a-glance information about specific issues or trends. Each alert card 908 typically includes a percentage value, descriptive text, and a sparkline 910 showing historical trends. The information presented on these cards may include metrics such as denial rates, operations metrics, and claims submission data. In some implementations, the alert cards 908 may be interactive, allowing users to drill down into more detailed information or take immediate action directly from the card interface.

The sparkline 910 featured on each alert card 908 provides a compact, line graph-like visualization of the metric's trend over time. This visual representation may allow users to quickly assess whether a particular metric is improving, declining, or remaining stable. In some embodiments, the sparkline 910 may be color-coded to indicate positive or negative trends, or include markers for significant events or threshold crossings. Some implementations might offer the option to expand the sparkline 910 into a full-sized chart for more detailed analysis.

The alert cards 908 contain detailed information about insurance claims, including specific ICD and CPT codes, percentage changes, and the timing of alerts (e.g., "30 m ago"). This level of detail may allow users to quickly understand the nature and context of each alert. In some implementations, the system may use natural language generation techniques to create human-readable alert descriptions that clearly communicate the issue and its implications. Some embodiments might include the ability to customize the information displayed on the alert cards 908 based on user preferences or role-specific requirements.

The interface includes filtering options at the bottom of the alert section 904, allowing users to view alerts by categories such as "Denials," "Submissions," "Collections," and "Remits." These filters may enable users to focus on specific aspects of the revenue cycle that are most relevant to their responsibilities. A time period selector displays "All Time" as the current selection, allowing users to adjust the timeframe for the displayed alerts and metrics. In some implementations, the filtering system may incorporate AI-driven recommendations to suggest the most relevant filters based on the current state of the revenue cycle or the user's historical behavior.

The GUI 900 demonstrates an approach to presenting healthcare revenue cycle data and alerts in an intuitive and actionable format. By leveraging AI and machine learning techniques, the system may provide timely and relevant information to users, enabling them to quickly identify and address issues in their revenue cycle management processes. This approach may address the technical challenges of managing complex healthcare financial data, allowing healthcare providers to optimize their operations and improve their financial performance.

To further describe some implementations in greater detail, reference is next made to examples of techniques which may be performed by or using an AI system as described herein. FIG. 10 is a flowchart of an example of a technique 1000 associated with providing alerts associated with healthcare financial workflows. The technique 1000 can be executed using computing devices, such as the systems, hardware, and software described with respect to FIGS. 1A-9. The technique 1000 can be performed, for example, by executing a machine-readable program or other computer-executable instructions, such as routines, instructions, programs, or other code. The steps, or operations, of the technique 1000, or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations of the technique 1000 can occur in various orders and/or concurrently. Additionally, other steps or operations not presented and described herein may be used. Furthermore, not all illustrated steps or operations may be required to implement a technique in accordance with the disclosed subject matter.

At 1002, the technique 1000 includes ingesting data from a set of disparate computer-based data sources. In some implementations, these computer-based data sources may include EHR systems, practice management systems, clearinghouse services, payer portals, and financial management systems. For example, a data ingestion pipeline (e.g., the data ingestion pipeline 414 shown in FIG. 4, which may include the communication component 110 shown in FIGS. 1A-IC) may be used to communicate with a set of computer-based data sources, which may transmit data to the communication component 110. The transmitted data may be ingested based on being received, decrypted, or decoded, among other examples. The ingested data may encompass various aspects of healthcare revenue cycle management, such as patient information, claim details, payment histories, and payer policies. In some implementations, the data sources may also include real-time patient monitoring devices or wearable health trackers to provide a more comprehensive view of patient health and potential billing implications.

At 1004, the technique 1000 may involve generating structured data for storage in a database in accordance with a unified data schema by performing, based on a first set of machine learning models, a transformation operation on the data. For example, a data processing component (e.g., the data processing component 112 shown in FIGS. 1A-IC) may generate structured data for storage in a database in accordance with a unified data schema. In some implementations, the transformation process may include data cleaning, normalization, and enrichment operations tailored to healthcare revenue cycle management. For example, the system may employ entity resolution techniques to reconcile patient and provider information across different systems, ensuring data consistency and accuracy. Some implementations may incorporate NLP capabilities to extract meaningful information from unstructured clinical notes or payer correspondence.

At 1006, the technique 1000 may include identifying an anomaly associated with a transactional workflow by performing an anomaly detection operation on the structured data. For example, an ML component (e.g., the ML component 116 shown in FIGS. 1A-1C and/or the anomaly detection model 140 shown in FIG. 1D) may identify an anomaly associated with a transactional workflow by performing an anomaly detection operation on the structured data. This anomaly detection operation may be based on a second set of machine learning models. In some implementations, the transactional workflow may comprise healthcare insurance claims, claim denials, claim payments, claim reimbursements, claim submissions, or claim payment histories. The anomaly detection models may utilize techniques such as isolation forests, autoencoders, or clustering algorithms to flag potential issues like fraudulent claims, coding errors, or sudden changes in payer behavior. Some implementations may incorporate time series analysis to detect temporal anomalies, such as unexpected spikes in denial rates or changes in payment patterns over time.

At 1008, the technique 1000 may involve generating an alert event based on the identified anomaly. For example, an interface component (e.g., the interface component 118 shown in FIG. 1A and/or the application service component 130 shown in FIG. 1D) may generate an alert event based on the identified anomaly. In some implementations, this step may include automatically transforming the technical anomaly detection results into actionable information for end-users. The alert generation process may consider factors such as the type of anomaly, its potential financial impact, and historical patterns to determine the urgency and relevance of the alert. Some implementations may use natural language generation techniques to create human-readable alert descriptions that clearly communicate the issue and its implications.

At 1010, the technique 1000 may include determining an alert profile associated with a user device. For example, an interface component (e.g., the interface component 118 shown in FIG. 1A and/or the application service component 130 shown in FIG. 1D) may determine an alert profile associated with a user device. In some implementations, this step may involve tailoring the alert presentation based on user-specific or role-specific preferences. For example, the system may determine the role of a user associated with the user device and customize the alert profile accordingly. A billing specialist might receive detailed alerts about specific claims, while a financial executive might see higher-level alerts about overall revenue trends. Alternative embodiments may incorporate machine learning to adapt the alert profile to user behavior over time, improving the relevance and effectiveness of alerts based on how users interact with and respond to them.

At 1012, the technique 1000 may involve outputting alert data based on the alert event and the alert profile. For example, an interface component (e.g., the interface component 118 shown in FIG. 1A and/or the application service component 130 shown in FIG. 1D) may determine an alert profile associated with a user device. In some implementations, the interface component may output the alert data to another component of the AI system. This alert data may be configured to cause a user interface of the user device to present a user interface element associated with the alert event. In some implementations, the user interface element may comprise a selectable option configured to cause the user interface to present information associated with the anomaly. For example, the alert data may include various elements such as the alert description, relevant metrics, suggested actions, and links to more detailed information. Alternative embodiments may design the alert data to support interactive visualizations or augmented reality displays, allowing users to explore the underlying data and context of the alert more intuitively.

In some implementations, the technique 1000 may also include performing a data profiling operation on the received data using a third set of machine learning models. This data profiling step may involve analyzing and understanding the structure, content, and quality of incoming data from various sources. Data profiling techniques may include statistical analysis, pattern recognition, and metadata extraction to identify data types, formats, relationships, and anomalies within the input data. Alternative embodiments may employ machine learning algorithms to automate the data profiling process, enabling the discovery of complex data patterns and interdependencies that may not be apparent through manual inspection.

The technique 1000 may further involve establishing a set of data flows associated with the set of data sources, where each data flow is associated with a different respective data schema. This step may facilitate handling the diverse data formats and structures encountered in healthcare revenue cycle management. In some implementations, the system may employ various data integration techniques, including API connections, SFTP file transfers, and database replication, to ensure a continuous flow of up-to-date information. Alternative embodiments may incorporate blockchain technology to enhance data integrity and traceability, particularly for sensitive healthcare information.

In some implementations, the technique 1000 may include determining claim structure patterns associated with the data based on the set of data schemas. This step may involve analyzing the various data schemas to identify common patterns and structures in healthcare claims across different systems and payers. The system may then generate or update the second set of machine learning models based on these claim structure patterns. This approach may allow the anomaly detection models to adapt to the specific characteristics and nuances of the healthcare provider's claim data, potentially improving the accuracy and relevance of the detected anomalies.

The technique 1000 may also incorporate a feedback mechanism to continuously improve the AI system's performance. In some implementations, this may involve annotating the alert event with feedback metadata to generate an enriched alert. The system may receive user input from an alert user device associated with an alert user, indicating the relevance or usefulness of the alert. This feedback can be used to refine the anomaly detection models, adjust alert prioritization, and improve the overall effectiveness of the alerting system. Alternative embodiments may employ reinforcement learning techniques to optimize the alert generation and presentation process based on user interactions and outcomes.

Figure 11:
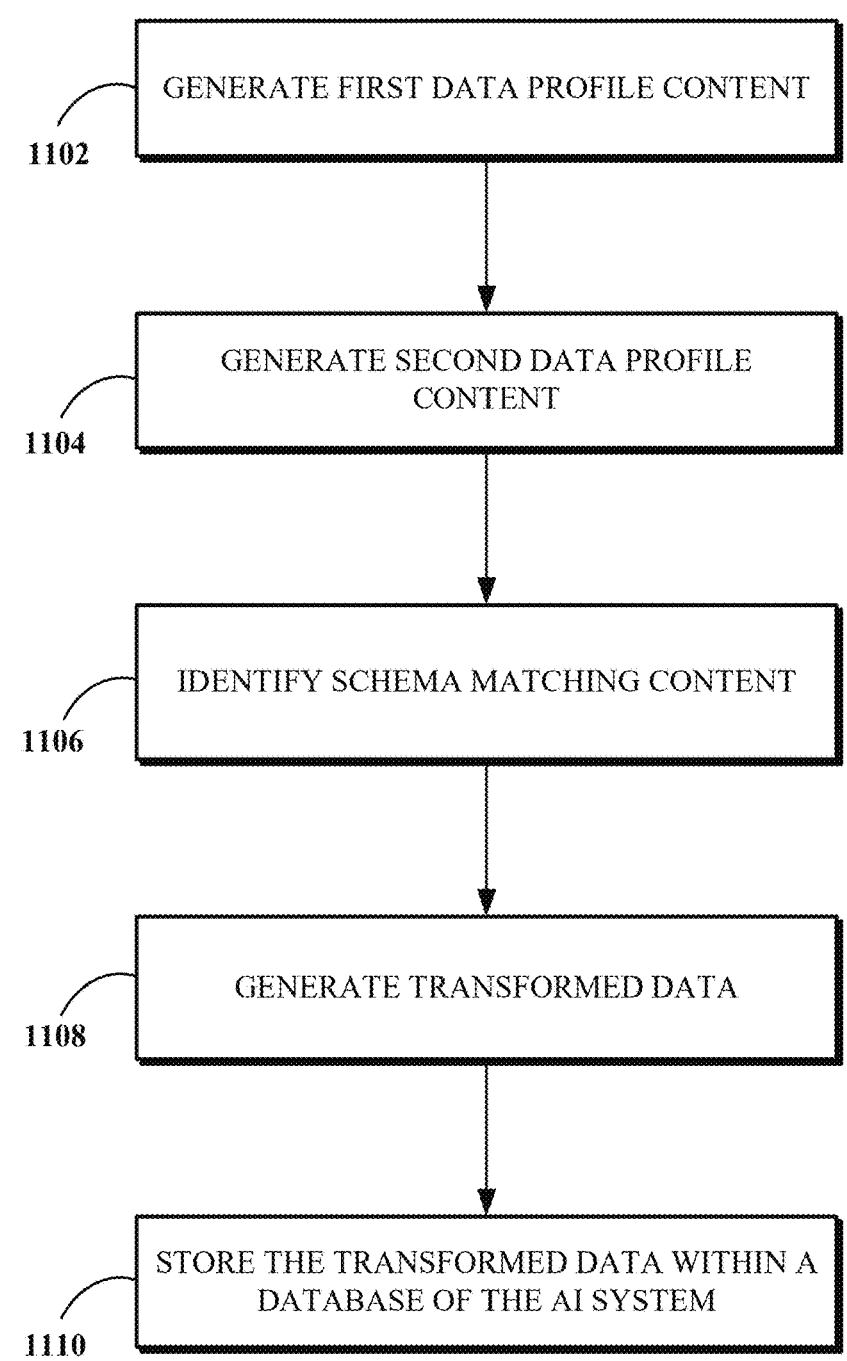
FIG. 11 is a flowchart of an example of a technique associated with data integration and transformation for healthcare revenue cycle management.

FIG. 11 is a flowchart of an example of a technique 1100 associated with data integration and transformation for healthcare revenue cycle management. The technique 1100 can be executed using computing devices, such as the systems, hardware, and software described with respect to FIGS. 1A-9. The technique 1100 can be performed, for example, by executing a machine-readable program or other computer-executable instructions, such as routines, instructions, programs, or other code. The steps, or operations, of the technique 1100, or another technique, method, process, or algorithm described in connection with the implementations disclosed herein can be implemented directly in hardware, firmware, software executed by hardware, circuitry, or a combination thereof.

For simplicity of explanation, the technique 1100 is depicted and described herein as a series of steps or operations. However, the steps or operations of the technique 1100 can occur in various orders and/or concurrently. Additionally, other steps or operations not presented and described herein may be used. Furthermore, not all illustrated steps or operations may be required to implement a technique in accordance with the disclosed subject matter.

At 1102, the technique 1100 may include generating first data profile content by performing, using an ML-based data profiling tool, an analysis on first data associated with a first data source. For example, a data layer and/or a processing layer (e.g., the data layer 402 and/or the processing layer 404 shown in FIG. 4) may generate the first data profile content. The first data profile content may identify first data schema content associated with the first data. The first data source may be a computer-based data source such as, for example, an EHR system, a practice management system, or a clearinghouse service. The ML-based data profiling tool may employ various data analysis techniques, such as statistical analysis, pattern recognition, and metadata extraction, to identify data types, formats, relationships, and anomalies within the input data.

At 1104, the technique 1100 may involve generating second data profile content by performing, using the ML-based data profiling tool, an analysis on second data associated with a second data source, wherein the second data profile content identifies second data schema content associated with the second data. For example, a data layer and/or a processing layer (e.g., the data layer 402 and/or the processing layer 404 shown in FIG. 4) may generate the second data profile content. Similar to the first data profile content, the second data profile content may identify second data schema content associated with the second data. The second data source may be different from the first data source, such as a payer portal or a financial management system. In some implementations, the first and second data profile content may further identify data type information associated with their respective data sources.

At 1106, the technique 1100 may include identifying schema matching content by performing, using an ML-based schema matching component, a schema matching operation wherein the schema matching content is associated with a match between a first schema associated with the first data schema content and a second schema associated with the second data schema content. For example, a data layer and/or a processing layer (e.g., the data layer 402 and/or the processing layer 404 shown in FIG. 4) may identify the schema matching content. This step may involve using NLP techniques to detect relationships between column names, descriptions, or metadata associated with the first and second data schema content. In some implementations, the machine learning component may comprise a rule engine configured to apply one or more rules to the first and second data profile content to generate an identification of data type information corresponding thereto.

At 1108, the technique 1100 may involve generating transformed data by performing, using an ML-based data transformation component and based on the schema matching content, a data transformation operation based on converting at least one of the first data or the second data from a source data format to a unified data format associated with a unified data schema. For example, a processing layer (e.g., the processing layer 404 shown in FIG. 4) may generate the transformed data. This operation may involve converting at least one of the first data or the second data from a source data format to a unified data format associated with a unified data schema. The unified data schema may be generated based on patterns associated with the first and second schemas, allowing for comprehensive analysis across previously siloed data sources.

At 1110, the technique 1100 may include storing the transformed data within a database. For example, a database component (e.g., the database component 114 shown in FIGS. 1A-1C) may store the transformed data. This step may involve using an ML-based data management component configured to manage data consistency, versioning, and quality within the database. In some implementations, the database may be part of a larger data lake architecture designed to efficiently store and manage large volumes of diverse healthcare data.

In some implementations, the technique 1100 may further include performing, using an ML-based data cleaning component, a data cleaning operation to correct anomalies in the first or second data. This operation may involve standardizing medical code formats, handling inconsistent units of measurement, or resolving conflicts between overlapping data elements. Additionally, an ML-based completion tool may be employed to complete incomplete fields in the data, using historical trends or similarity analysis to infer missing information.

The technique 1100 may also involve performing, using an ML-based entity resolution component, an entity resolution operation to resolve entity differences or duplicate record differences between the first and second data schema information. This operation may employ fuzzy matching techniques, clustering algorithms, or deep learning models to identify and reconcile discrepancies in entity representations across different data sources.

In some implementations, the technique 1100 may include performing, using an ML-based data integration component, a data integration operation to establish data flows between a data ingestion pipeline and the data sources. This may involve using ML-powered APIs to facilitate seamless data exchange and synchronization across multiple databases associated with the AI system. The data integration component may also be responsible for managing the ongoing flow of data, ensuring that the AI system's database remains up-to-date with the latest information from various healthcare IT systems.

The technique 1100 may incorporate a feedback mechanism to continuously improve the AI system's performance. This may involve collecting user feedback on the accuracy and usefulness of the transformed data, which can be used to refine the data profiling, schema matching, and transformation processes. In some implementations, reinforcement learning techniques may be employed to optimize the data integration and transformation workflows based on observed outcomes and user interactions.

By leveraging ML techniques throughout the data integration and transformation process, the technique 1100 may address the technical challenges associated with unifying disparate healthcare data sources. This approach may enable healthcare providers to gain a more comprehensive view of their revenue cycle, identify opportunities for optimization, and make data-driven decisions to improve financial performance. The resulting unified data model may serve as a foundation for advanced analytics, predictive modeling, and automated decision-making in healthcare revenue cycle management.

Figure 12:
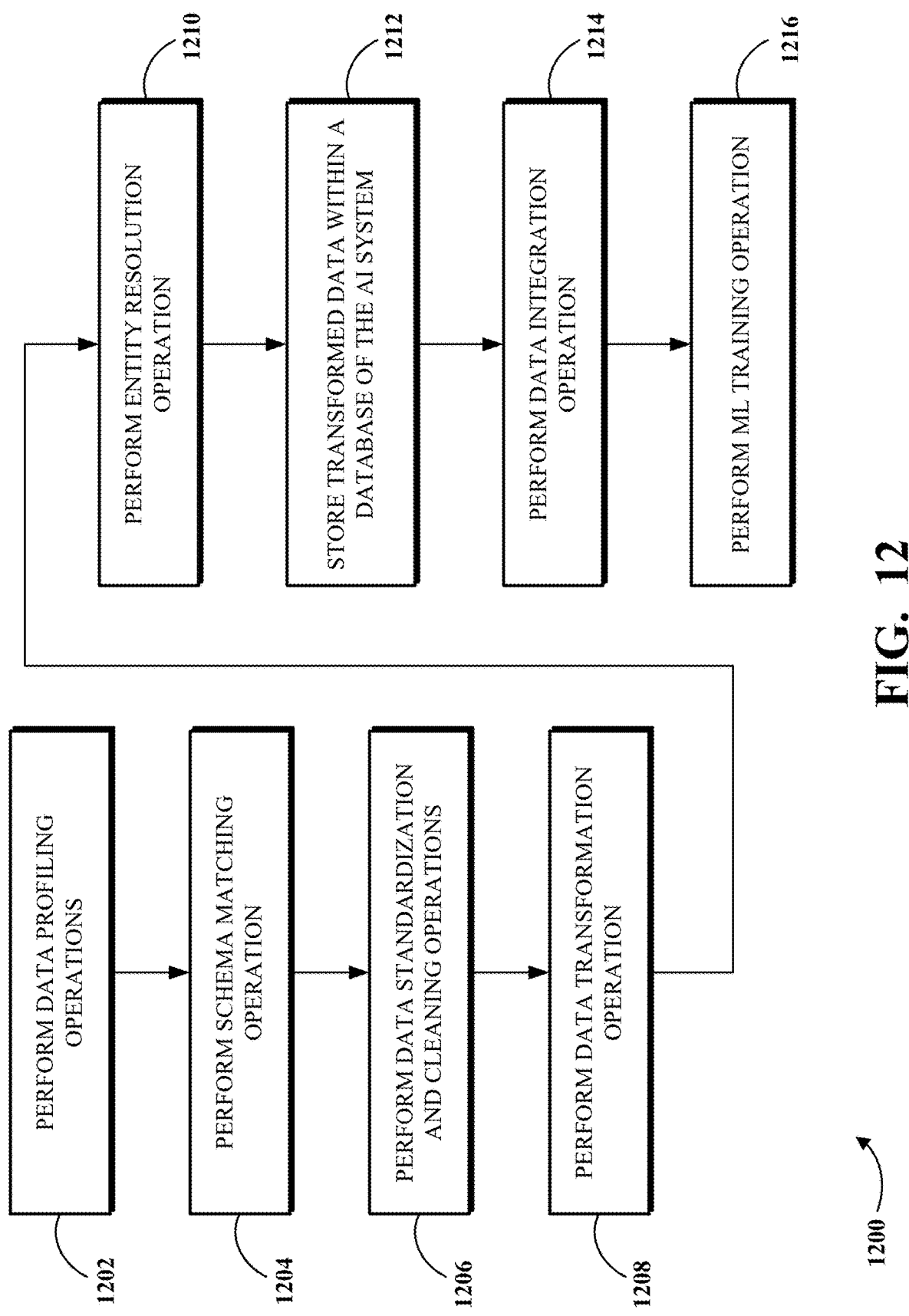
FIG. 12 is a flowchart of an example of a technique associated with data integration and transformation for healthcare revenue cycle management.

FIG. 12 is a flowchart of an example of a technique 1200 associated with data integration and transformation for healthcare revenue cycle management. The technique 1200 can be executed using computing devices, such as the systems, hardware, and software described with respect to FIGS. 1A-5. The technique 1200 can be performed, for example, by executing a machine-readable program or other computer-executable instructions, such as routines, instructions, programs, or other code. The steps, or operations, of the technique 1200, or another technique, method, process, or algorithm described in connection with the implementations disclosed herein can be implemented directly in hardware, firmware, software executed by hardware, circuitry, or a combination thereof.

For simplicity of explanation, the technique 1200 is depicted and described herein as a series of steps or operations. However, the steps or operations of the technique 1200 can occur in various orders and/or concurrently. Additionally, other steps or operations not presented and described herein may be used. Furthermore, not all illustrated steps or operations may be required to implement a technique in accordance with the disclosed subject matter.

FIG. 12 is a flowchart of an example of a technique 1200 associated with data integration and transformation for healthcare revenue cycle management. The technique 1200 can be executed using computing devices, such as the systems, hardware, and software described with respect to FIGS. 1A-9. The technique 1200 can be performed, for example, by executing a machine-readable program or other computer-executable instructions, such as routines, instructions, programs, or other code. The steps, or operations, of the technique 1200, or another technique, method, process, or algorithm described in connection with the implementations disclosed herein can be implemented directly in hardware, firmware, software executed by hardware, circuitry, or a combination thereof.

For simplicity of explanation, the technique 1200 is depicted and described herein as a series of steps or operations. However, the steps or operations of the technique 1200 can occur in various orders and/or concurrently. Additionally, other steps or operations not presented and described herein may be used. Furthermore, not all illustrated steps or operations may be required to implement a technique in accordance with the disclosed subject matter.

At 1202, the technique 1200 may include performing a data profiling operation. For example, a data layer and/or a processing layer (e.g., the data layer 402 and/or the processing layer 404 shown in FIG. 4) may be used to perform the data profiling operation. In some implementations, this step may involve using an ML-based data profiling tool of an AI system to analyze first data associated with a first data source and generate first data profile content. The first data profile content may identify first data schema content associated with the first data. Additionally, the ML-based data profiling tool may be used to analyze second data associated with a second data source and generate second data profile content, which may identify second data schema content associated with the second data. In some aspects, the first and second data profile content may further identify data type information associated with their respective data sources. The data profiling operation may employ various data analysis techniques, such as statistical analysis, pattern recognition, and metadata extraction, to identify data types, formats, relationships, and anomalies within the input data.

At 1204, the technique 1200 may involve performing a schema matching operation on the profiled data. For example, a data layer and/or a processing layer (e.g., the data layer 402 and/or the processing layer 404 shown in FIG. 4) may perform the schema matching operation. In some implementations, this step may use an ML component of the AI system to identify schema matching content associated with a match between a first schema associated with the first data schema content and a second schema associated with the second data schema content. The machine learning component may comprise a natural language processing component configured to use natural language processing to detect relationships between column names, descriptions, or metadata associated with the first and second data schema information. In some aspects, the ML component may include a rule engine configured to apply one or more rules to the first and second data profile content to generate an identification of the data type information. The rule engine may be further configured to update these rules based on an ML clustering operation.

At 1206, the technique 1200 may include performing data standardization and cleaning operations on the matched data. For example, a data layer and/or a processing layer (e.g., the data layer 402 and/or the processing layer 404 shown in FIG. 4) may perform the data standardization and cleaning operations on the matched data. In some implementations, this step may involve using an ML-based data cleaning component to correct anomalies in the first or second data. This may include standardizing medical code formats, handling inconsistent units of measurement, or resolving conflicts between overlapping data elements. Additionally, an ML-based completion tool may be employed to complete incomplete fields in the data, using historical trends or similarity analysis to infer missing information. In some aspects, the system may implement a standardization operation to map a first medical code format associated with the first data to a second medical code format associated with the second data.

At 1208, the technique 1200 may involve performing a data transformation operation to convert the standardized data into a desired format. For example, a processing layer (e.g., the processing layer 404 shown in FIG. 4) may perform the data transformation operation. In some implementations, this step may use an ML-based data transformation component of the AI system to generate transformed data based on the schema matching content. The operation may involve converting at least one of the first data or the second data from a source data format to a unified data format associated with a unified data schema. The unified data schema may be generated based on patterns associated with the first and second schemas, allowing for comprehensive analysis across previously siloed data sources. In some aspects, the data transformation operation may incorporate advanced entity resolution techniques, using probabilistic matching algorithms to link patient records or claims data across disparate systems, even in the absence of perfect identifier matches.

At 1210, the technique 1200 may include performing an entity resolution operation on the transformed data. For example, a processing layer (e.g., the processing layer 404 shown in FIG. 4) may perform the entity resolution operation. In some implementations, this step may use an ML-based entity resolution component to resolve entity differences or duplicate record differences between the first and second data schema content. The entity resolution operation may employ fuzzy matching techniques, clustering algorithms, or deep learning models to identify and reconcile discrepancies in entity representations across different data sources. This process may be particularly important in healthcare revenue cycle management, where patient and provider information may be represented differently across various systems.

At 1212, the technique 1200 may involve storing the transformed data within a database of the AI system. For example, a database component (e.g., the database component 114 shown in FIGS. 1A-1C) may store the transformed data. In some implementations, this step may use an ML-based data management component configured to manage data consistency, versioning, and quality within the database. The database may be part of a larger data lake architecture designed to efficiently store and manage large volumes of diverse healthcare data. In some aspects, the system may implement advanced data compression techniques or utilize a combination of relational and NoSQL databases to accommodate the diverse types of data encountered in revenue cycle management.

At 1214, the technique 1200 may include performing a data integration operation to connect the stored data with other system components. For example, a database manager (e.g., the database manager 124 shown in FIGS. 1A-IC) may perform the data integration operation. In some implementations, the database manager may include an ML-based data integration component configured to establish data flows throughout the AI system. This may involve using ML-powered APIs to facilitate seamless data exchange and synchronization across multiple databases associated with the AI system. The data integration component may also be responsible for managing the ongoing flow of data, ensuring that the AI system's database remains up-to-date with the latest information from various healthcare IT systems.

At 1216, the technique 1200 may involve performing an ML training operation using the integrated data. For example, an intelligence layer (e.g., the intelligence layer 406 shown in FIG. 4) may perform the ML training operation. In some implementations, this step may use the transformed and integrated data to train or update the ML models used throughout the AI system. This may include refining the models used for anomaly detection, predictive analytics, or automated decision-making in healthcare revenue cycle management. The training process may incorporate feedback mechanisms to continuously improve the AI system's performance based on observed outcomes and user interactions.

In some implementations, the technique 1200 may also include additional steps or variations of the described steps. For example, the system may incorporate blockchain technology to enhance data integrity and traceability, particularly for sensitive healthcare information. The data transformation process may also involve semantic enrichment, where additional context and meaning are added to the raw data. This may include mapping local codes to standardized terminologies, inferring missing information based on available data, and linking related data elements across different sources.

The technique 1200 may also implement advanced privacy and security measures throughout the data integration and transformation process. This may include techniques for data anonymization, encryption, and access control to ensure compliance with healthcare data privacy regulations such as HIPAA. In some aspects, the system may employ differential privacy techniques to allow for meaningful analysis of healthcare data while protecting individual patient privacy.

By leveraging AI and machine learning techniques throughout the data integration and transformation process, the technique 1200 may address the technical challenges associated with unifying disparate healthcare data sources. This approach may enable healthcare providers to gain a more comprehensive view of their revenue cycle, identify opportunities for optimization, and make data-driven decisions to improve financial performance. The resulting unified data model may serve as a foundation for advanced analytics, predictive modeling, and automated decision-making in healthcare revenue cycle management.

Some implementations include a system comprising a memory subsystem storing instructions; and processing circuitry configured to execute the instructions to cause the system to: generate first data profile content by performing, using a machine-learning (ML)-based data profiling tool, an analysis on first data associated with a first data source, wherein the first data profile content identifies first data schema content associated with the first data; generate second data profile content by performing, using the ML-based data profiling tool, an analysis on second data associated with a second data source, wherein the second data profile content identifies second data schema content associated with the second data; identify schema matching content by performing, using an ML-based schema matching component, a schema matching operation wherein the schema matching content is associated with a match between a first schema associated with the first data schema content and a second schema associated with the second data schema content; generate transformed data by performing, using an ML-based data transformation component and based on the schema matching content, a data transformation operation based on converting at least one of the first data or the second data from a source data format to a unified data format associated with a unified data schema; and store a result of the data transformation operation within a database.

In some implementations, the processing circuitry is configured to execute the instructions to further cause the system to perform, using an ML-based data cleaning component, a data cleaning operation to correct at least one anomaly in at least one of the first data or the second data.

In some implementations, the processing circuitry is configured to execute the instructions to further cause the system to perform, using an ML-based standardization tool, a standardization operation to map a first medical code format associated with the first data to a second medical code format associated with the second data.

In some implementations, the processing circuitry is configured to execute the instructions to further cause the system to perform, using an ML-based completion tool, a completion operation to complete at least one incomplete field included in the first data or the second data.

In some implementations, to cause the system to perform the completion operation, the processing circuitry is configured to execute the instructions to cause the system to perform the completion operation based on at least one of an historical trend or a similarity analysis that compares the at least one incomplete field to a complete field included in another data.

In some implementations, the processing circuitry is configured to execute the instructions to further cause the system to generate the unified data schema based on at least one pattern associated with the first schema and the second schema.

In some implementations, the processing circuitry is configured to execute the instructions to further cause the system to perform, using an ML-based entity resolution component, an entity resolution operation to resolve at least one of an entity difference between first entity information associated with the first data schema content and second entity information associated with the second data schema content or a duplicate record difference between the first data schema content and the second data schema content.

In some implementations, the entity resolution operation comprises at least one of a fuzzy matching operation, a clustering operation, or a deep learning operation based on the at least one of the entity difference or the duplicate record difference.

Some implementations include a method comprising generating first data profile content by performing, using a machine-learning (ML)-based data profiling tool, an analysis on first data associated with a first data source, wherein the first data profile content identifies first data schema content associated with the first data; generating second data profile content by performing, using the ML-based data profiling tool, an analysis on second data associated with a second data source, wherein the second data profile content identifies second data schema content associated with the second data; identifying schema matching content by performing, using an ML-based schema matching component, a schema matching operation wherein the schema matching content is associated with a match between a first schema associated with the first data schema content and a second schema associated with the second data schema content; generating transformed data by performing, using an ML-based data transformation component and based on the schema matching content, a data transformation operation based on converting at least one of the first data or the second data from a source data format to a unified data format associated with a unified data schema; and storing the transformed data within a database.

In some implementations, the first data profile content further identifies first data type information associated with the first data, and wherein the second data profile content further identifies second data type information associated with the second data.

In some implementations, the first data profile content further identifies at least one discrepancy between the first data schema content and the second data schema content.

In some implementations, the schema matching content is indicative of a match between a first column name associated with the first data schema information and a second column name associated with the second data schema content.

In some implementations, the ML-based schema matching component comprises a natural language processing component configured to use natural language processing to detect at least one of a relationship between a first column name associated with the first data schema content and a second column name associated with the second data schema content, a relationship between a first description associated with the first data schema content and a second description associated with the second data schema content, or a relationship between a first metadata associated with the first data schema content and a second metadata associated with the second data schema content.

In some implementations, the ML-based schema matching component comprises a rule engine configured to apply one or more rules to the first data profile content and the second data profile content to generate an identification of the at least one of first data type information or second data type information.

In some implementations, the ML-based schema matching component is further configured to update the one or more rules based on a machine learning clustering operation.

Some implementations include a non-transitory computer readable medium storing instructions operable to cause one or more processors to perform operations comprising: generating first data profile content by performing, using a machine-learning (ML)-based data profiling tool, an analysis on first data associated with a first data source, wherein the first data profile content identifies first data schema content associated with the first data; generating second data profile content by performing, using the ML-based data profiling tool, an analysis on second data associated with a second data source, wherein the second data profile content identifies second data schema content associated with the second data; identifying schema matching content by performing, using an ML-based schema matching component, a schema matching operation wherein the schema matching content is associated with a match between a first schema associated with the first data schema content and a second schema associated with the second data schema content; generating transformed data by performing, using an ML-based data transformation component and based on the schema matching content, a data transformation operation based on converting at least one of the first data or the second data from a source data format to a unified data format associated with a unified data schema; and storing a result of the data transformation operation within a database.

In some implementations, the operations further comprising performing, using an ML-based data integration component, a data integration operation to establish at least one data flow between a data ingestion pipeline and at least one of the first data source or the second data source.

In some implementations, the ML-based data integration component comprises an ML-powered application programming interface, and wherein performing the data integration operation comprises invoking the ML-powered application programming interface to perform the at least one data flow.

In some implementations, the operations further comprising performing, using the ML-based data integration component, an additional data integration operation to synchronize a plurality of databases.

In some implementations, the operations further comprising managing the database using an ML-based data management component configured to manage at least one of data consistency, data versioning, or data quality.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The adjectives "first," "second," "third," and so on are used for contextual distinction between two or more of the modified nouns in connection with a discussion and are not meant to be absolute modifiers that apply only to a certain respective node throughout the entire document. For example, a component may be referred to as a "first component" in connection with one discussion and may be referred to as a "second component" in connection with another discussion, or vice versa. Reference to a component, a computing device, a server, a client, an application, an apparatus, a device, a system, a computing system, or the like may include disclosure of the computing device, server, client, application, apparatus, device, system, computing system, or the like, respectively, being a node. For example, disclosure that a computing device is configured to receive information from a server also discloses that a first node is configured to receive information from a second node. Consistent with this disclosure, once a specific example is broadened in accordance with this disclosure (e.g., a computing device is configured to receive information from a server also discloses that a first node is configured to receive information from a second node), the broader example of the narrower example may be interpreted in the reverse, but in a broad open-ended way. In the example above where a computing device being configured to receive information from a server also discloses a first node being configured to receive information from a second node, "first node" may refer to a first computing device, a first server, a first client, a first application, a first apparatus, a first device, a first system, a first computing system, or the like, configured to receive the information from a second node; and "second node" may refer to a second computing device, a second server, a second client, a second application, a second apparatus, a second device, a second system, a second computing system, or the like.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by a processing system. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing system.

A processor may include one or more chips, system-on-chips (SoCs), chipsets, packages, or devices that individually or collectively constitute or comprise a processing system. The processing system includes a processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software.

As used herein, the term "engine" may include software, hardware, or a combination of software and hardware. An engine may be implemented using software stored in the memory subsystem. Alternatively, an engine may be hard-wired into the processing system. In some cases, an engine includes a combination of software stored in the memory subsystem and hardware that is hard-wired into the processing system.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

49

What is claimed is:

1. A system, comprising:
a memory subsystem storing instructions; and
processing circuitry configured to execute the instructions to cause the system to:
generate first data profile content by performing, using a machine-learning-based data profiling tool, an analysis on first data associated with a first data source, wherein the first data profile content identifies first data schema content associated with the first data;
generate second data profile content by performing, using the machine-learning-based data profiling tool, an analysis on second data associated with a second data source, wherein the second data profile content identifies second data schema content associated with the second data;
perform, using a machine-learning-based schema matching component, a schema matching operation to generate schema matching data identifying a match between a first schema associated with the first data schema content and a second schema associated with the second data schema content;
generate transformed data by performing, using a machine-learning-based data transformation component and based on the schema matching data, a data transformation operation based on converting at least one of the first data or the second data from a source data format to a unified data format associated with a unified data schema; and
store a result of the data transformation operation within a database.

2. The system of claim 1, wherein the processing circuitry is configured to execute the instructions to further cause the system to perform, using an a machine-learning-based data cleaning component, a data cleaning operation to correct at least one anomaly in at least one of the first data or the second data.

3. The system of claim 1, wherein the processing circuitry is configured to execute the instructions to further cause the system to perform, using a machine-learning-based standardization tool, a standardization operation to map a first medical code format associated with the first data to a second medical code format associated with the second data.

4. The system of claim 1, wherein the processing circuitry is configured to execute the instructions to further cause the system to perform, using a machine-learning-based completion tool, a completion operation to complete at least one incomplete field included in the first data or the second data.

5. The system of claim 4, wherein, to cause the system to perform the completion operation, the processing circuitry is configured to execute the instructions to cause the system to perform the completion operation based on at least one of an historical trend or a similarity analysis that compares the at least one incomplete field to a complete field included in another data.

6. The system of claim 1, wherein the processing circuitry is configured to execute the instructions to further cause the system to generate the unified data schema based on at least one pattern associated with the first schema and the second schema.

7. The system of claim 1, wherein the processing circuitry is configured to execute the instructions to further cause the system to perform, using a machine-learning-based entity resolution component, an entity resolution operation to resolve at least one of an entity difference between first entity information associated with the first data schema content and second entity information associated with the second data schema content or a duplicate record difference between the first data schema content and the second data schema content.

8. The system of claim 7, wherein the entity resolution operation comprises at least one of a fuzzy matching operation, a clustering operation, or a deep learning operation based on the at least one of the entity difference or the duplicate record difference.

9. A method, comprising:
generating first data profile content by performing, using a machine-learning-based data profiling tool, an analysis on first data associated with a first data source, wherein the first data profile content identifies first data schema content associated with the first data;
generating second data profile content by performing, using the machine-learning-based data profiling tool, an analysis on second data associated with a second data source, wherein the second data profile content identifies second data schema content associated with the second data;
performing, using an a machine-learning-based schema matching component, a schema matching operation to generate schema matching data identifying a match between a first schema associated with the first data schema content and a second schema associated with the second data schema content;
generating transformed data by performing, using a machine-learning-based data transformation component and based on the schema matching data, a data transformation operation based on converting at least one of the first data or the second data from a source data format to a unified data format associated with a unified data schema; and
storing the transformed data within a database.

10. The method of claim 9, wherein the first data profile content further identifies first data type information associated with the first data, and wherein the second data profile content further identifies second data type information associated with the second data.

11. The method of claim 9, wherein the first data profile content further identifies at least one discrepancy between the first data schema content and the second data schema content.

12. The method of claim 9, wherein the schema matching data is indicative of a match between a first column name associated with the first data schema content and a second column name associated with the second data schema content.

13. The method of claim 9, wherein the machine-learning-based schema matching component comprises a natural language processing component configured to use natural language processing to detect at least one of a relationship between a first column name associated with the first data schema content and a second column name associated with the second data schema content, a relationship between a first description associated with the first data schema content and a second description associated with the second data schema content, or a relationship between a first metadata associated with the first data schema content and a second metadata associated with the second data schema content.

14. The method of claim 9, wherein the machine-learning-based schema matching component comprises a rule engine configured to apply one or more rules to the first data profile content and the second data profile content to generate an identification of the at least one of first data type information or second data type information.

15. The method of claim 14, wherein the machine-learning-based schema matching component is further configured to update the one or more rules based on a machine learning clustering operation.

16. A non-transitory computer readable medium storing instructions operable to cause one or more processors to perform operations comprising:

generating first data profile content by performing, using a machine-learning-based data profiling tool, an analysis on first data associated with a first data source, wherein the first data profile content identifies first data schema content associated with the first data;

generating second data profile content by performing, using the machine-learning-based data profiling tool, an analysis on second data associated with a second data source, wherein the second data profile content identifies second data schema content associated with the second data;

performing, using a machine-learning-based schema matching component, a schema matching operation to generate schema matching data identifying a match between a first schema associated with the first data schema content and a second schema associated with the second data schema content;

generating transformed data by performing, using a machine-learning-based data transformation component and based on the schema matching data, a data transformation operation based on converting at least one of the first data or the second data from a source data format to a unified data format associated with a unified data schema; and storing a result of the data transformation operation within a database.

17. The non-transitory computer readable medium of claim 16, the operations further comprising performing, using a machine-learning-based data integration component, a data integration operation to establish at least one data flow between a data ingestion pipeline and at least one of the first data source or the second data source.

18. The non-transitory computer readable medium of claim 17, wherein the machine-learning-based data integration component comprises a machine-learning-powered application programming interface, and wherein performing the data integration operation comprises invoking the machine-learning-powered application programming interface to perform the at least one data flow.

19. The non-transitory computer readable medium of claim 17, the operations further comprising performing, using the machine-learning-based data integration component, an additional data integration operation to synchronize a plurality of databases.

20. The non-transitory computer readable medium of claim 16, the operations further comprising managing the database using a machine-learning-based data management component configured to manage at least one of data consistency, data versioning, or data quality.

\* \* \* \* \*